(12) United States Patent　(10) Patent No.: US 12,501,212 B2
Kwon et al.　(45) Date of Patent: Dec. 16, 2025

(54) ELECTRONIC DEVICE AND METHOD FOR PROVIDING USER INTERFACE THEREOF

(71) Applicant: SAMSUNG ELECTRONICS CO., LTD., Suwon-si (KR)

(72) Inventors: Jeongwook Kwon, Suwon-si (KR); Misun Kim, Suwon-si (KR); Taeuk Park, Suwon-si (KR); Hyunjin Um, Suwon-si (KR); Sangheon Kim, Suwon-si (KR); Mira Seo, Suwon-si (KR); Hyomin Oh, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/112,037

(22) Filed: Feb. 21, 2023

(65) Prior Publication Data

US 2023/0199387 A1　Jun. 22, 2023

Related U.S. Application Data

(63) Continuation of application No. PCT/KR2022/011697, filed on Aug. 5, 2022.

(30) Foreign Application Priority Data

Aug. 9, 2021　(KR) .................. 10-2021-0104696

(51) Int. Cl.
*H04R 3/02* (2006.01)
*G09G 5/00* (2006.01)
*H04M 1/03* (2006.01)

(52) U.S. Cl.
CPC ............... *H04R 3/02* (2013.01); *G09G 5/005* (2013.01); *H04M 1/03* (2013.01);
(Continued)

(58) Field of Classification Search
CPC .. H04R 3/02; H04R 2400/03; H04R 2499/11; G09G 5/005; G09G 2320/08; H04M 1/03
(Continued)

(56) References Cited

U.S. PATENT DOCUMENTS 9,184,732 B2　11/2015　Lee et al.
9,349,264 B2 *　5/2016　Heubel .................... H03F 1/36
(Continued)

FOREIGN PATENT DOCUMENTS

JP　2004-240855　8/2004
JP　2018-019393　2/2018
(Continued)

OTHER PUBLICATIONS

Extended European Search Report dated Mar. 5, 2024 issued in European Patent Application No. 22856122.1.

*Primary Examiner* — Paul Kim
*Assistant Examiner* — Con P Tran
(74) *Attorney, Agent, or Firm* — NIXON & VANDERHYE P.C.

(57) ABSTRACT

An electronic device may include: a memory, a display, a haptic module comprising haptic circuitry, a sound module comprising audio circuitry, and a processor. The processor may be configured to: detect an event for an output of vibration and sound, delay the output of the vibration, change a sound output mode from a first mode to a second mode for fast output while the output of the vibration is delayed, output the sound using the sound module in the second mode, and output the delayed vibration through the haptic module to be synchronized with the output of the sound. As the sound output mode is changed to the second mode, a sound output path may be opened. The sound output path may be changed from the first path for non-fast output to the second path for fast output.

20 Claims, 20 Drawing Sheets

(52) U.S. Cl.
CPC ..... *G09G 2320/08* (2013.01); *H04R 2400/03* (2013.01); *H04R 2499/11* (2013.01)

(58) Field of Classification Search
USPC ................. 381/93, 151, 162, 164, 333, 388; 340/407.1, 384.1, 384.5, 384.6, 384.7, 340/384.71, 384, 73; 455/550.1, 566
See application file for complete search history.

(56) References Cited

U.S. PATENT DOCUMENTS

| | | | |
|---|---|---|---|
| 9,613,506 B2* | 4/2017 | Moussette | G11B 27/10 |
| 10,620,704 B2 | 4/2020 | Rand et al. | |
| 10,832,537 B2 | 11/2020 | Doy et al. | |
| 10,969,871 B2 | 4/2021 | Rand et al. | |
| 12,260,020 B2* | 3/2025 | Ito | G06F 3/016 |
| 2008/0165984 A1 | 7/2008 | Yun et al. | |
| 2009/0058829 A1 | 3/2009 | Kim et al. | |
| 2010/0148942 A1 | 6/2010 | Oh et al. | |
| 2013/0163785 A1 | 6/2013 | Lee et al. | |
| 2015/0061846 A1 | 3/2015 | Yliaho | |
| 2015/0273322 A1 | 10/2015 | Nakagawa et al. | |
| 2018/0203514 A1* | 7/2018 | Nakagawa | G06F 3/016 |
| 2019/0033970 A1 | 1/2019 | Mellor et al. | |
| 2019/0227628 A1 | 7/2019 | Rand et al. | |
| 2020/0379569 A1 | 12/2020 | Scott et al. | |
| 2020/0401164 A1 | 12/2020 | Miyazaki et al. | |
| 2023/0186738 A1* | 6/2023 | Yokoyama | G06F 3/016 340/407.1 |

FOREIGN PATENT DOCUMENTS

| | | |
|---|---|---|
| JP | 2020-177440 | 10/2020 |
| KR | 10-2008-0065879 | 7/2008 |
| KR | 10-2010-0052752 | 5/2010 |
| KR | 10-2011-0076283 | 7/2011 |
| KR | 10-2012-0126446 | 11/2012 |
| KR | 10-2013-0075323 | 7/2013 |
| KR | 10-2015-0080740 | 7/2015 |
| KR | 10-2011771 | 10/2019 |

* cited by examiner

ELECTRONIC DEVICE AND METHOD FOR PROVIDING USER INTERFACE THEREOF

CROSS-REFERENCE TO RELATED APPLICATIONS

This application is a continuation of International Application No. PCT/KR2022/011697 designating the United States, filed on Aug. 5, 2022, in the Korean Intellectual Property Receiving Office and claiming priority to Korean Patent Application No. 10-2021-0104696, filed on Aug. 9, 2021, in the Korean Intellectual Property Office, the disclosures of which are incorporated by reference herein in their entireties.

BACKGROUND

Field

The disclosure relates to an electronic device and a method for providing a user interface thereof.

Description of Related Art

Electronic devices (for example, smartphones, mobile terminals, laptops, tablets, or wearable devices) may perform various functions such as a voice communication function, a short-range wireless communication function, a mobile communication function, an imaging function, a content playback function, and a navigation function.

In addition, there has been widespread use of flexible-type electronic devices (for example, smartphones) having displays, the physical form or size of which is variable. Slidable-type or foldable-type electronic devices may employ displays which can be expanded or reduced such that demands for both large screens and portability can be satisfied. For example, when an electronic device is in a slide-in state or folded state, the display may be reduced, thereby maintaining portability. When the electronic device is in a slide-out state or unfolded state, the display may be expanded, thereby providing a wide screen.

The importance of user interfaces is also increasing day by day as electronic devices have improved performances, increased availability, and diversified functions or structures.

When an electronic device uses different types of inter interfaces (for example, vibrations and sounds), it may be difficult to implement harmonious interactions therebetween.

For example, different pieces of hardware are used to output vibrations and sounds, and different software logics are used to process, treat, or output different types of data (vibration data and sound data), and synchronization may accordingly be difficult. If synchronization fails, vibrations and sounds may be output separately without being harmonized.

If synchronization fails, the electronic device may be unable to transfer useful information to the user at the exact timing in an efficient manner Moreover, user interfaces that are not harmonious with each other and thus are unnatural may degrade the user's interest, immersion, or attention because they are unrelated to the user's senses or actions in the real world or to the actual situation of the electronic device.

SUMMARY

Various embodiments of the disclosure may implement a harmonious interaction between different types of user interfaces, thereby transferring natural, highly-immersive, and pleasing experiences, or improving manipulation usability.

Various embodiments of the disclosure may improve performance of synchronization between different types of user interfaces, thereby transferring useful information to the user in an attentive and intuitive manner Various embodiments of the disclosure may reflect a change in mechanical state of a flexible-type electronic device or the corresponding electronic device in actions of the user who uses the same in real time such that vivid, realistic, and pleasing experiences are transferred to the user.

An electronic device according to various example embodiments may include: a memory, a display, a haptic module comprising haptic circuitry, a sound module comprising audio circuitry, and at least one processor. The at least one processor may be operatively connected to the memory, the display, the haptic module, and the sound module. The memory may store instructions which, when executed, cause the at least one processor to: detect an event for an output of vibration and sound, delay the output of the vibration, change a sound output mode from a first mode to a second mode for fast output while the output of the vibration is delayed, output the sound using the sound module in the second mode, and output the delayed vibration through the haptic module to be synchronized with the output of the sound.

A method of providing a user interface of an electronic device according to various example embodiments may include: detecting an event for an output of vibration and sound, delaying the output of the vibration, changing a sound output mode from a first mode to a second mode for fast output while the output of the vibration is delayed, outputting the sound using the sound module in the second mode, and outputting the delayed vibration to be synchronized with the output of the sound.

According to various example embodiments, a harmonious interaction between different types of user interfaces may be implemented, thereby transferring natural, highly-immersive, and pleasing experiences, or improving manipulation usability.

According to various example embodiments, performance of synchronization between different types of user interfaces may be improved, thereby transferring useful information to the user in an attentive and intuitive manner According to various example embodiments, a change in mechanical state of a flexible-type electronic device or the corresponding electronic device may be reflected in actions of the user who uses the same in real time such that vivid, realistic, and pleasing experiences are transferred to the user.

Various other advantageous effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Hereinafter, various example embodiments will be described in greater detail with reference to the accompanying drawings.

Figure 1:
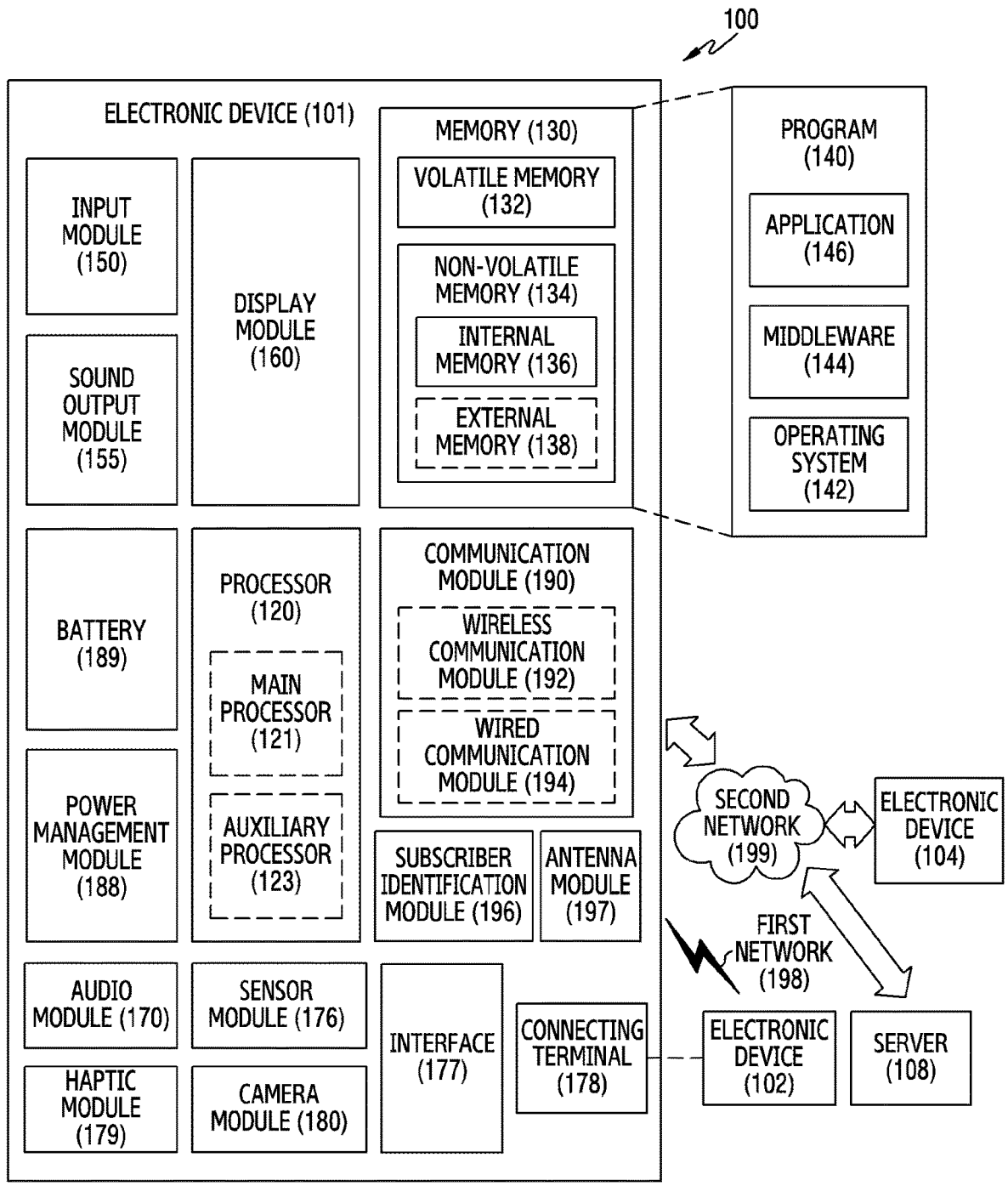
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
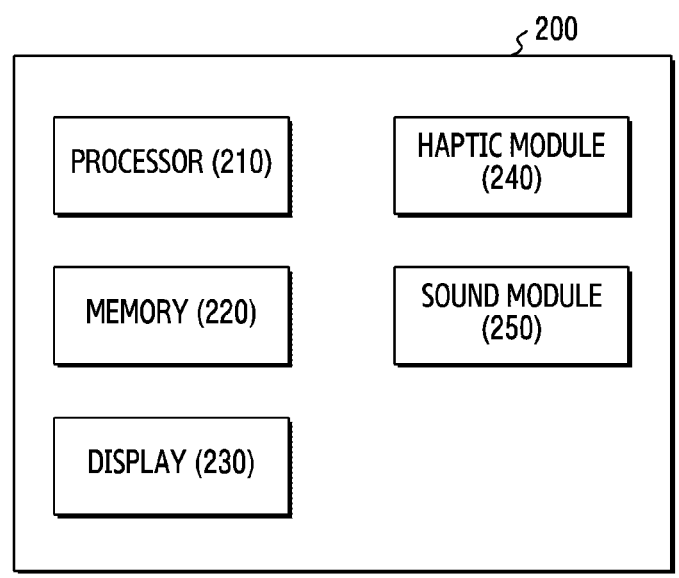
FIG. 2 is a block diagram illustrating an example configuration of an electronic device according to various embodiments.

FIG. 2 is a block diagram illustrating an example configuration of an electronic device according to various embodiments.

In an embodiment, an electronic device 200 may include at least a part of the electronic device 101 illustrated in FIG. 1.

Referring to FIG. 2, the electronic device 200 may include a processor (e.g., including processing circuitry) 210, a memory 220, a display 230, a haptic module (e.g., including haptic circuitry) 240, and a sound module (e.g., including audio circuitry) 250. For example, the processor 210, the memory 220, the display 230, and the haptic module 240 of FIG. 2 may correspond to the processor 120, the memory 130, the display module 160, and the haptic module 179 of FIG. 1, respectively. The sound module 250 of FIG. 2 may include at least a portion of the audio module 170 and the sound output module 155 of FIG. 1.

The electronic device 200 may include additional components in addition to the components illustrated in FIG. 2. At least one of the components shown in FIG. 2 may be omitted.

The processor 210, the memory 220, the display 230, the haptic module 240, and the sound module 250 included in the electronic device 200 may be electrically and/or operatively connected to each other to exchange signals (e.g., commands or data).

In an embodiment, the processor 210 may include at least one processor. For example, the processor 210 may include at least one of an application processor (AP) (e.g., the main processor 121 of FIG. 1) and a communication processor (CP) (e.g., the auxiliary processor 123), etc.

The processor 210 may include various processing circuitry and execute and/or control various functions supported by the electronic device 200. The processor 210 may control at least some of the memory 220, the display 230, the haptic module 240, and the sound module 250. A function (or logic) designated by the control may be performed.

The processor 210 may execute an application by executing a code written in a programming language stored in the memory 220 of the electronic device 200, and may control various types of hardware.

In an embodiment, as instructions stored in the memory 220 are executed, an operation of the processor 210 may be performed. The processor 210 may execute the instructions stored in the memory 220 to perform a designated function (or logic).

In an embodiment, each of the display 230, the haptic module 240, and/or the sound module 250 may be an output module for providing a user interface (UI) of a designated type. Different types of user interfaces may be output through the display 230, the haptic module 240, and/or the sound module 250.

In an embodiment, sound that is an auditory user interface may be output (or reproduced) through the sound module 250. Vibration, which corresponds to a tactile user interface, may be output (or reproduced) through the haptic module 240.

In an embodiment, a hybrid user interface may be output through a combination between the sound module 250 and the haptic module 240.

In various embodiments, a visual element that is a visual user interface may be additionally output (e.g., displayed) through the display 230. The visual element may include at least one of a graphic element (e.g., animation) displayed through the display 230 and a dimming element expressed by lighting of the display 230. For example, the graphic element may include all kinds of elements that can be output (or displayed) through the display 230, such as animations, icons, menus, message windows, images, or screens. The dimming element may be an element that can be expressed through dimming control for the lighting of the display 230. For example, the dimming element may be an element implementing any one of screen turn-on, screen brightness increase, and screen flickering of the display 230.

In various embodiments, a hybrid user interface may be output through a combination between the display 230, the sound module 250, and the haptic module 240.

In an embodiment, the processor 210 may synchronize the output timing by eliminating output deviations between different types of user interfaces (e.g., between vibration and sound or between vibration, sound, and visual elements).

For example, the processor 210 may synchronize the outputs of two types of user interfaces such as vibration and sound. As another example, the processor 210 may synchronize the output of three types of user interfaces such as vibration, sound, and visual elements.

In an embodiment, the processor 210 may detect an event for outputting vibration and sound. The processor 210 may delay the output of the vibration. For example, the processor 210 may delay a vibration output timing (or a vibration start timing) by a designated offset (e.g., 70 ms to 80 ms) so that the vibration starts at a sound output timing (or a sound start timing).

The processor 210 may change a sound output mode from a first mode to a second mode for fast output while the output of the vibration is delayed.

For example, as the sound output mode is changed to the second mode, a sound output path may be opened so that the sound module 250 may be activated. For another example, as the sound output mode is changed to the second mode, the sound output path may be changed from a first path for non-fast output to a second path for fast output.

The timing at which the sound output mode is changed from the first mode to the second mode may be different depending on the embodiment. For example, the corresponding timing may be different according to an operation scenario of the electronic device 200.

For example, the processor 210 may change the sound output mode to the second mode for fast output in response to the event (or immediately after the event occurs). In this example, the timing of changing to the second high-speed mode may correspond to a timing of the occurrence of the event (e.g., within a predetermined offset {e.g., ±30 ms}). As the sound output mode is changed to the second mode in response to the event, the sound output path may be changed from the first path for non-fast output to the second path for fast output.

For another example, the processor 210 may change the sound output mode to the second mode for fast output in response to a pre-event of the event. In this example, the timing of changing to the second high-speed mode may correspond to a timing of the occurrence of the pre-event (e.g., within a predetermined offset {e.g., ±30 ms}), and the timing of sound output may correspond to the timing of the occurrence of the event (e.g., within a predetermined offset {e.g., ±30 ms}). As the sound output mode is changed to the second mode in response to the pre-event, the sound output path may be opened and the sound module 250 may be first activated, and then the sound may be transmitted through the activated sound module 250 in response to the event.

When the sound output path is opened and/or the sound module 250, which may include a hardware element for sound output, is activated in advance, synchronization performance may be improved by reducing the time required for sound output by a predetermined value (e.g., 10 ms) or more.

In an embodiment, the sound output progress state of the electronic device 200 may be sequentially switched from a standby state to a ready state, an idle state, and a playing state according to the progress degree of the sound output. In this case, as the sound output progress state is switched to the idle state immediately before playing the sound, a signal for requesting an output of the delayed vibration may be transmitted from the sound output path to a vibration output path.

The sound output path may continue the process of the sound output after the signal is transmitted. The vibration output path may delay vibration and may output the delayed vibration in response to the signal. Accordingly, synchronization performance between vibration and sound may be improved.

In an embodiment, when the sound output mode is the first mode that is a non-fast output mode, a first buffer (a buffer for non-fast output) may be used. When the sound output mode is the second mode, a second buffer (a buffer for fast output) may be used for fast output. The second buffer may have a smaller size or latency than the first buffer.

In an embodiment, the processor 210 may output sound using the sound module 250 in the second mode and may output delayed vibration through the haptic module 240 so that the output of the sound and the delayed vibration can be synchronized.

In various embodiments, the electronic device 200 may detect an event for the output of vibration, sound, and visual element. In this case, the electronic device 200 may additionally perform an operation for synchronizing the output of the visual element with the output of vibration and sound. For example, the electronic device 200 may shift the output timing of the visual element (e.g., animation). In addition, the electronic device 200 may delay the output of the vibration, and may open at least a portion of the sound output path while the output of the vibration is delayed, or may change the sound output mode from a non-fast output mode (e.g., the first mode) to a fast output mode (e.g., the second mode). The electronic device 200 may output sound through the sound module 250 using at least one of the opened sound output path and the fast output mode, may output the delayed vibration through the haptic module 240, and may output the visual element through the display 230 to correspond to the shifted output timing, so that the output of the delayed vibration and the output of the visual element can be synchronized.

According to an embodiment, the electronic device 200 may implement a harmonious interaction through synchronization in various situations requiring physical feedback (e.g., at least some combinations of vibration as tactile feedback, sound as audible feedback, and/or visual elements as visual feedback).

Figure 3:
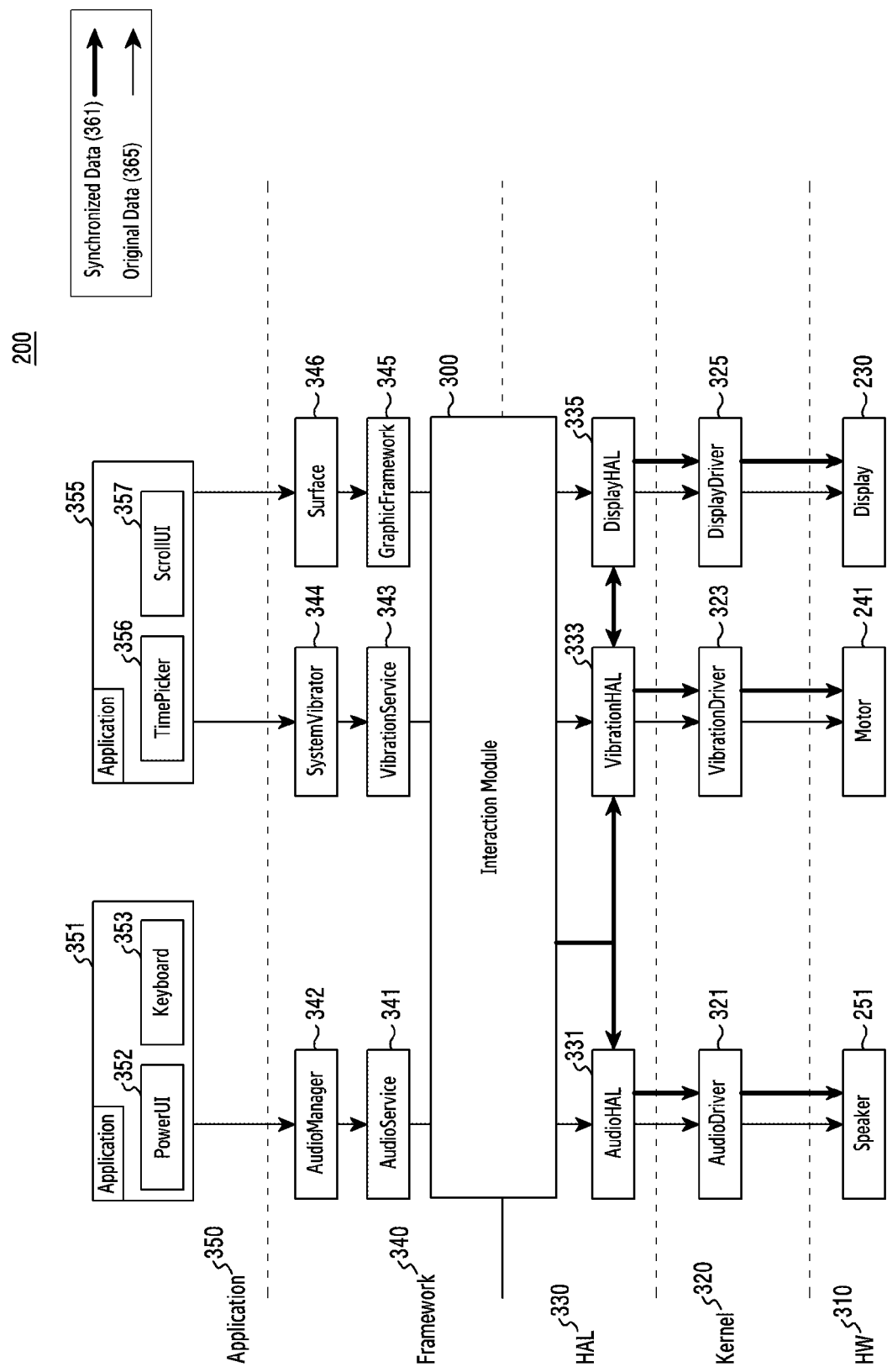
FIG. 3 is a block diagram illustrating an example hierarchical structure of an electronic device according to various embodiments.

FIG. 3 is a block diagram illustrating an example hierarchical structure of an electronic device according to various embodiments.

Referring to FIG. 3, the electronic device 200 may include a hardware layer 310, a kernel layer 320, an abstraction layer 330 (hardware abstraction layer, HAL), a framework layer 340, and an application layer 350.

In an embodiment, the hardware layer 310 may include a speaker 251, a motor 241, and a display 230. Each component of the hardware layer 310 may be implemented as physically separated hardware. For example, the speaker 251 may be included in the sound module 250 of FIG. 2. The motor 241 may be included in the haptic module 240 of FIG. 2. The display 230 may correspond to the display 230 of FIG. 2.

Each component of the kernel layer 320, the abstraction layer 330, the framework layer 340, and/or the application layer 350 may be implemented as firmware and/or software to be stored in the memory 220 of the electronic device 200. For example, the processor 210 of the electronic device 200 may execute instructions stored in the memory 220 to operate each component. Alternatively, each component may operate as the instructions stored in the memory 220 are executed.

The components of the kernel layer 320, the abstraction layer 330, the framework layer 340, and/or the application layer 350 may control at least one of the components (e.g., at least one of the speaker 251, the motor 241, and the display 230) of the hardware layer 310, or may perform a designated function (or logic) through the corresponding component.

The kernel layer 320 may include an audio driver 321, a vibration driver 323, and a display driver 325.

The HAL 330 may include an audio HAL 331, a vibration HAL 333, and a display HAL 335.

The framework layer 340 may include an audio service 341, an audio manager 342, a vibration service 343, a system vibrator 344, a graphics framework 345, and a graphics surface 346.

The interaction module 300 may be configured between the HAL 330 and the framework layer 340. For example, instructions of the interaction module 300 may be stored in the memory 220 and may be executed by the processor 210. The interaction module 300 may be for synchronization between different types of user interfaces, for example vibration, sound, and graphics. The interaction module 300 may interwork with the HAL 330 and the framework layer 340 for a synchronization operation. For example, a portion of the interaction module 300 may be implemented in the HAL 330 to interwork with the audio HAL 331, the vibration HAL 333, and the display HAL 335 within the HAL 330. Another portion of the interaction module 300 may be implemented in the framework layer 340 to interwork with the audio service 341, the vibration service 343, and the graphics framework 345 within the framework layer 340.

The application layer 350 may include one or more applications or one or more application components. For example, the application layer 350 may include an application 351 including a power UI module 352 and a keyboard module 353, and an application 355 including a time picker module 356 and a scroll UI module 357.

Reference numeral 365 may indicate a flow of original data (e.g., commands, signals, and/or data). The original data may be unsynchronized data. For example, the original data may not go through the interaction module 300. For example, when the outputs of vibration, sound, and graphics are not synchronized, the synchronization operation for the output between the audio service 341, the vibration service 343, and/or the graphics framework 345 may be omitted. In this case, first data output from the audio service 341, second data output from the vibration service 343, and third data output from the graphics framework 345 may be individually processed. The first data, the second data, and the third data may be transmitted to the audio HAL 331, the vibration HAL 333, and the display HAL 335, respectively, without a synchronization process.

Reference numeral 361 may indicate a flow of synchronized data (e.g., commands, signals, and/or data). For example, the synchronized data may pass through the interaction module 300. For example, when the outputs of vibration, sound, and graphics are synchronized, a synchronization operation for the output between the audio service 341, the vibration service 343, and/or the graphics framework 345 may be executed. In this case, the first data output from the audio service 341, the second data output from the vibration service 343, and the third data output from the graphic framework 345 may be subjected to interaction. The first data, the second data, and the third data may be synchronized and transmitted to the audio HAL 331, the vibration HAL 333, and the display HAL 335 at substantially the same timing.

Due to this, it may be possible to synchronize a sound output timing through the speaker 251, a vibration output timing through the motor 241, and/or a visual element output timing through the display 230.

Figure 4:
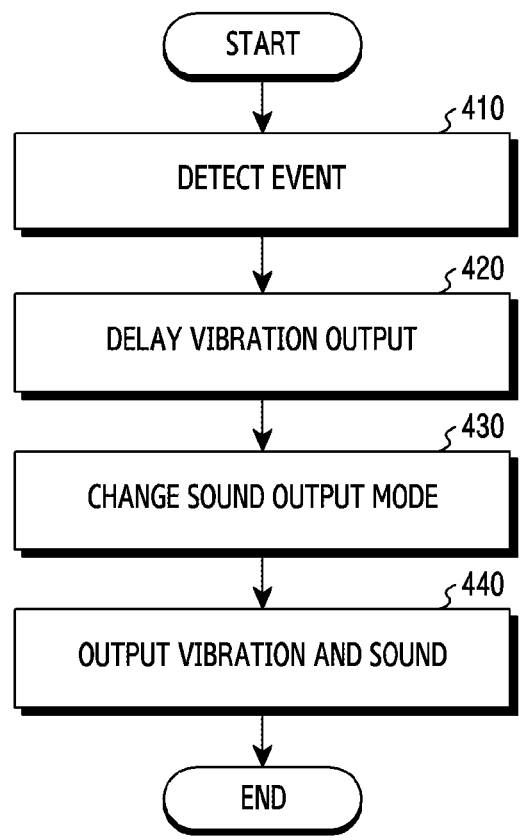
FIG. 4 is a flowchart illustrating an example method of providing a user interface of an electronic device according to various embodiments.

FIG. 4 is a flowchart illustrating an example method of providing a user interface of an electronic device according to various embodiments. The embodiment of FIG. 4 may correspond to a method for synchronization between vibration and sound.

Referring to FIG. 4, a method of providing a user interface of an electronic device according to an embodiment may include operations 410, 420, 430, and 440. The method may be performed by an electronic device (e.g., the electronic device 101 of FIG. 1, the electronic device 200 of FIG. 2, or the processor 210 of FIG. 2). For convenience, it is assumed that each operation of the method is performed by the electronic device 200 of FIG. 2. However, the disclosure is not limited thereto. In various embodiments, at least one of the illustrated operations may be omitted, the order of some operations may be changed, or other operations may be added.

In operation 410, the electronic device 300 may detect an event.

In an embodiment, the event may be an event for which different types of user interfaces are required. The event may be an event for which physical feedback (tactile feedback and auditory feedback) is required in real time. The event may be an event for outputting vibration and sound.

For example, the event may be a user input event. The user input event may be an event that occurs according to a user's physical manipulation action. For example, the user input event may be a gesture interaction event. For example, the user input event may be any one of a scroll event of FIG. 11D, a touch event of FIG. 11E, a touch event of FIGS. 12A and 12B, a handwriting event of FIG. 13A, a hinge event of FIG. 13B, a folding event or unfolding event of FIGS. 13A and 13B, a sliding event, a control event, a keyboard event, and a switching (on, off) event of FIG. 13C.

For another example, the event may be a cues event. The queue event may be a signaling event for information transfer. For example, the queue event may be any one of a state transition event (e.g., a charger connection event of FIG. 11A), an event notifying any one of a warning, an error, a failure, and successes (e.g., an authentication error event of FIG. 11B), a notification event, a guidance event (e.g., a guidance event in FIG. 11C), an emotional event (e.g., a celebration), an alarm event, or an incoming call event.

In an embodiment, the electronic device 200 may adjust the output timing of vibration and sound to synchronize sound and vibration having different output durations. The electronic device 200 may adjust one or more of two factors such as a sound output timing and a vibration output timing.

Operations 420 and 430 may be for synchronizing outputs of vibration and sound.

In the electronic device 200, a time required to output sound (e.g., 200 to 300 ms) may be longer than a time required to output vibration (e.g., 50 ms). A vibration output procedure may be completed in a shorter time (e.g., 50 ms) compared to a sound output procedure. Therefore, the electronic device 200 may synchronize the output of the vibration and the sound by delaying the vibration and outputting the vibration in response to the sound output timing.

In operation 420, the electronic device 200 may delay the output of the vibration. The timing of outputting the vibration may be shifted due to the delay. For example, the electronic device 200 may apply a designated offset (e.g., 70 ms to 80 ms) to delay (or shift) the vibration output timing (or the vibration start timing) by the offset, thereby controlling vibration to be output together at the sound output timing (or the sound start timing). Accordingly, the vibration output timing may be delayed, so that the synchronization performance between vibration and sound may be improved.

In operation 430, the electronic device 200 may change the sound output mode from a first mode for non-fast output to a second mode for faster output while the output of the vibration is delayed. Accordingly, the sound output timing may be advanced, so that the synchronization performance between vibration and sound may be improved.

Figure 8:
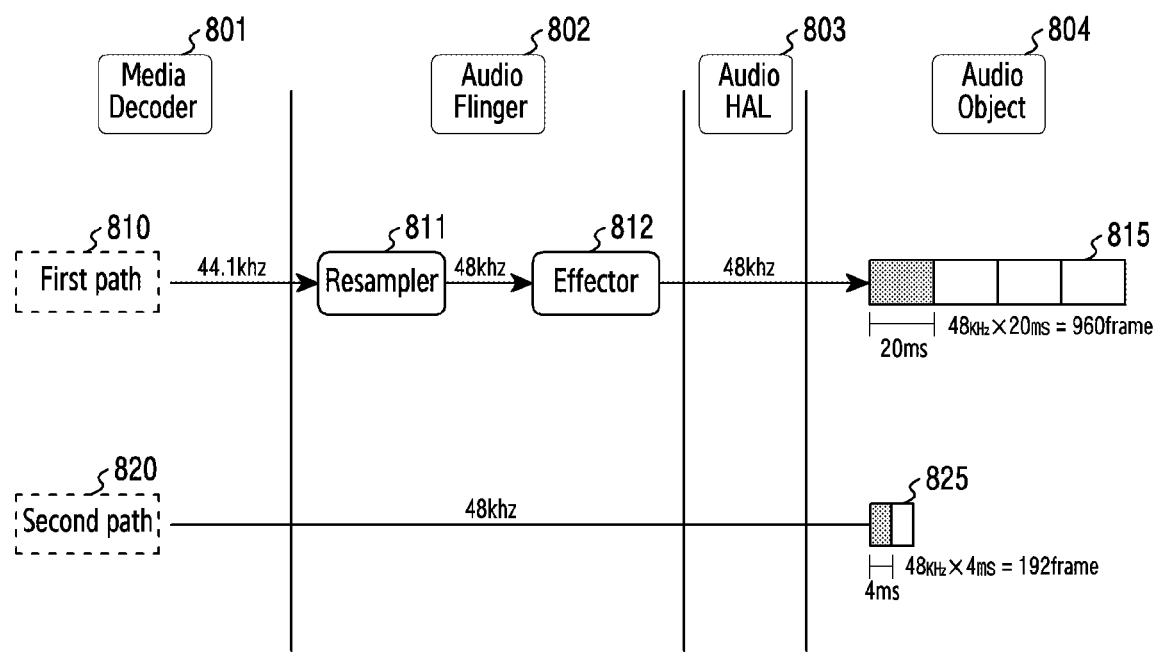
FIG. 8 is a signal flow diagram illustrating an example operation of switching a sound output mode in an electronic device according to various embodiments.

In the first mode, sound may be output through a non-fast output path (e.g., a first path 810 of FIG. 8). The non-fast output path may be a default path designated for sound output. The non-fast output path may include hardware components for sound output (e.g., the sound module 250 of FIG. 2 and the speaker 251 of FIG. 3).

In the second mode, the sound output path may be opened in advance before an event occurs, or may be changed from the non-fast output path to a faster output path (e.g., a second path 820 of FIG. 8).

For example, as the sound output mode is changed to the second mode, the electronic device 200 may open the sound output path to activate the sound module 250. The opening timing of the sound output path may correspond to a timing before the occurrence of an event (e.g., the occurrence of a pre-event).

For another example, as the sound output mode is changed to the second mode, the electronic device 200 may change the sound output path from the first path for non-fast output (e.g., the first path 810 in FIG. 8) to the second path for fast output (e.g., the second path 820 of FIG. 8). The second path may be a path obtained by skipping at least a portion of the first path or shortening the first path. Alternatively, the second path may include a different component (e.g., the second buffer 825 of FIG. 8) from the first path for the purpose of fast output.

In an embodiment, a method of synchronizing vibration and sound by opening a sound output path to activate the sound module 250 will be described in greater detail as follows.

A sound output procedure on the electronic device 200 may include a plurality of steps. As the sound output procedure progresses in a stepwise manner, the sound output progress state of the electronic device 200 may be sequentially switched. As the sound output procedure progresses in a stepwise manner, sound data may be sequentially transmitted from the beginning (e.g., the application 351 or 355 of FIG. 3) of the sound output path to the end (e.g., the sound module 250 of FIG. 2 or the speaker 251 of FIG. 3) thereof. For example, the sound output progress state of the electronic device 200 may be sequentially switched to four states, that is, a standby state, a ready state, an idle state, and a playing state.

The standby state may be a state in which sound data (or sound stream) is provided and a hardware element for sound output (e.g., the sound module 250 and the speaker 251) is deactivated.

The ready state may be a state in which sound data is provided and a hardware element for sound output is deactivated, but an arbitrary operation is started (e.g., an event occurs or a power saving mode is released) in the electronic device 200.

The idle state may be a state in which sound data is provided and a hardware element for sound output is activated.

The playing state may be a state in which sound data is provided, a hardware element for sound output is activated, and the electronic device 200 is working (e.g., a state in which sound is being reproduced).

As described above, when the sound output procedure of the electronic device 200 is performed in a stepwise manner, it may take a lot of time until the hardware element (e.g., the sound module 250 and the speaker 251) for sound output is activated. Due to this, the time required for sound output (e.g., 200 to 300 ms) may be relatively long compared to the time required for vibration output (e.g., 50 ms). The sound output timing may be relatively delayed compared to the vibration output timing.

The electronic device 200 may activate the hardware element (e.g., the sound module 250 and the speaker 251) for sound output at an earlier timing than the sound output timing, so that, when necessary, sound may be immediately output without an activation process for the hardware element.

In operation 440, the electronic device 200 may output sound using the sound module 250 in the second mode and may output delayed vibration through the haptic module 240 so that the output of the sound and the delayed vibration may be synchronized.

As the sound output mode of the electronic device 200 is changed from the first mode for non-fast output to the second mode for fast output, the sound output path may be opened or the sound output path may be changed (e.g., skipped or shortened) from the first path (e.g., the first path 810 of FIG. 8) for non-fast output to the second path (e.g., the second path 820 of FIG. 8) for fat output. For example, when the sound output path is opened, the time required for sound output may be reduced by about 100 ms, so that the vibration and sound may be synchronized. As another example, when the sound output path is changed (e.g., skipped or shortened), the time required for sound output may be reduced by about 90 ms, so that the vibration and sound may be synchronized.

In an embodiment, the electronic device 200 may change the sound output mode to the second mode for fast output in response to the corresponding event (or immediately after the event occurs). As the sound output mode is changed to the second mode, the sound output path may be opened to activate the sound module 250 and sound may be output through the activated sound module 250. For example, the electronic device 200 may perform an operation of opening the sound output path and an operation of outputting sound through the opened sound output path in response to a timing at which the event occurs.

In an embodiment, the electronic device 200 may change the sound output mode to the second mode for fast output in response to a pre-event of the event. As the sound output mode is changed to the second mode in response to the pre-event, the sound output path may be opened and the sound module 250 may be activated. Thereafter, the electronic device 200 may output sound through the sound module 250 activated in response to the event. For example, the electronic device 200 may open the sound output path in response to a first timing at which the pre-event occurs, and may then output sound through the opened sound output path in response to a second timing at which the event occurs.

In an embodiment, the sound output progress state in the electronic device 200 may be sequentially switched from a standby state to a ready state, an idle state, and a playing state. As the sound output progress state is switched to the idle state, a signal requesting the output of the delayed vibration may be transmitted from the sound output path to the vibration output path.

The sound output path may transmit the signal requesting the output of the delayed vibration to the vibration output path and may immediately switch to the playing state to output sound, and the vibration output path may output delayed vibration as the signal is received.

In this way, the electronic device 200 may perform at least a part (e.g., up to the idle state) of the sound output procedure that takes a relatively long time, and may then perform the vibration output procedure that takes a relatively short time, thereby implementing synchronization between the vibration and the sound.

In an embodiment, when the sound output mode is the first mode for fast output, a first buffer (e.g., a first buffer 815 of FIG. 8) may be used. When the sound output mode is the second mode for fast output, a second buffer (e.g., a second buffer 825 of FIG. 8) may be used. The second buffer may have a smaller size or latency than the first buffer.

Figure 5:
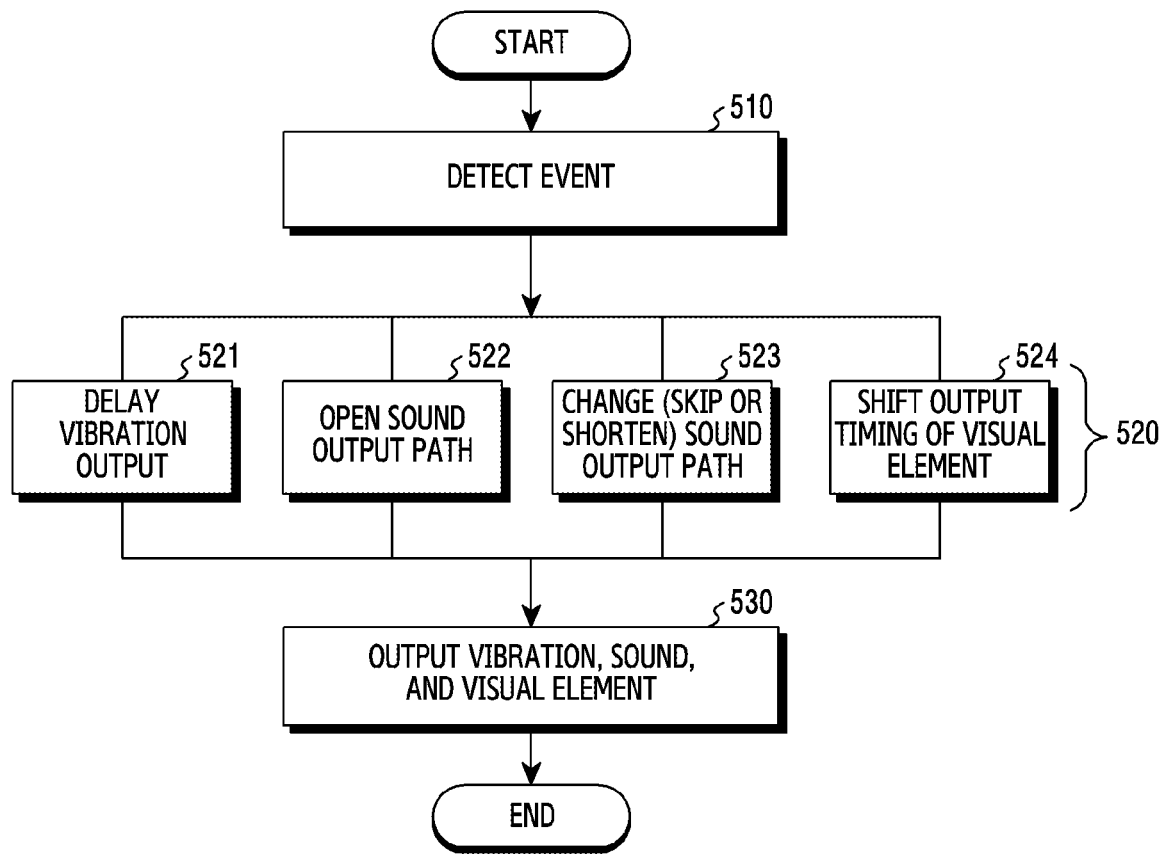
FIG. 5 is a flowchart illustrating an example method of providing a user interface of an electronic device according to various embodiments.

FIG. 5 is a flowchart illustrating an example method of providing a user interface of an electronic device according to various embodiments. FIG. 5 may correspond to a method for synchronization between vibration, sound, and a visual element.

Referring to FIG. 5, a method of providing a user interface of an electronic device according to an embodiment may include operations 510, 520, and 530. The method may be performed by an electronic device (e.g., the electronic device 101 of FIG. 1, the electronic device 200 of FIG. 2, or the processor 210 of FIG. 2). For convenience of description, it is assumed that each operation of the method is performed by the electronic device 200 of FIG. 2, but the disclosure is not limited thereto. In various embodiments, at least one of the illustrated operations may be omitted, the order of some operations may be changed, or other operations may be added.

Some of the operations of FIG. 5 may correspond to the operations of FIG. 4. For example, operation 510 may correspond to operation 410 of FIG. 4. Operation 521 may correspond to operation 420. Operation 522 and/or operation 523 may correspond to operation 430. Operation 530 may correspond to operation 440.

In operation 510, the electronic device 200 may detect an event. For example, the event may be an event for the output of vibration, sound, and a visual element.

Operation 520 may be for synchronizing the output of vibration, sound, and a visual element. Operation 520 may include at least one of operations 521, 522, 523, and 524.

The electronic device 200 may perform at least one of operations 521, 522, 523, and 524 to synchronize the output of vibration, sound, and a visual element.

In operation 521, the electronic device 200 may delay the output of vibration. A timing of the vibration output may be shifted due to the delay.

Operations 522 and 523 may be for changing a sound output mode from a first mode for non-fast output to a second mode for fast output. For example, as the sound output mode is changed to the second mode, a sound output path may be opened. As another example, as the sound output mode is changed to the second mode, the sound output path may be changed from the first path for non-fast output to the second path for fast output. A second path may be a path obtained by skipping at least a portion of the first path or shortening the first path. Alternatively, the second path may include a different component from the first path.

As the sound output mode is changed from the first mode to the second mode, the sound output timing may be advanced so that synchronization with the vibration output timing and/or the output timing of the visual element may be possible.

In operation 522, the electronic device 200 may open the sound output path for fast output of sound to activate a hardware element (e.g., the sound module 250 of FIG. 2 or the speaker 251 of FIG. 3) for sound output.

In operation 523, the electronic device 200 may configure the electronic device 200 to change the sound output path from the first path for non-fast output to the second path for fast output for the purpose of fast output of sound. For example, the second path may be a path obtained by skipping at least a portion of the first path or shortening the first path. As another example, the second path may include a different component from the first path.

In operation 524, the electronic device 200 may shift the output timing of the visual element in order to synchronize with vibration and sound.

In an embodiment, the visual element may include one or more of a graphics element (e.g., animation) and a dimming element. For example, the graphics element may include all kinds of elements that can be output (or displayed) through the display 230, such as animations, icons, menus, message windows, images, and screens. The dimming element may be an element that can be expressed through dimming control for lighting of the display 230. For example, the dimming element may be an element implementing any one of screen turn-on, screen brightness increase, and screen flickering of the display 230.

For example, the electronic device 200 may shift (e.g., delay or advance) the output timing of the visual element to correspond to the vibration output timing and/or sound output timing.

In an embodiment, the output timing of the visual element may correspond to a timing of generating a triggering signal for outputting the visual element. The electronic device 200 may generate the triggering signal for outputting the visual element according to the vibration output timing and/or the sound output timing. For example, the visual element (e.g., animation) may be displayed through the display 230 in response to the triggering signal.

In an embodiment, the electronic device 200 may adjust brightness (or screen brightness) by controlling dimming of the display 230 while displaying the visual element through the display 230. For example, in response to the triggering signal, the display of the visual element through the display 230 and the brightness adjustment of the display 230 may be simultaneously performed.

In an embodiment, the electronic device 200 may delay the output of vibration in operation 521, and may perform at least one of operations 522, 523, and 524 to synchronize the sound output timing and the output timing of the visual element with the vibration output timing while the output of the vibration is delayed.

In operation 530, the electronic device 200 may output sound using the sound module 250 in the second mode for fast output, may output the delayed vibration through the haptic module 240, and may output the visual element through the display 230 to correspond to the shifted output timing, so that the outputs of the sound, the delayed vibration, and the visual element may be synchronized.

Figure 6:
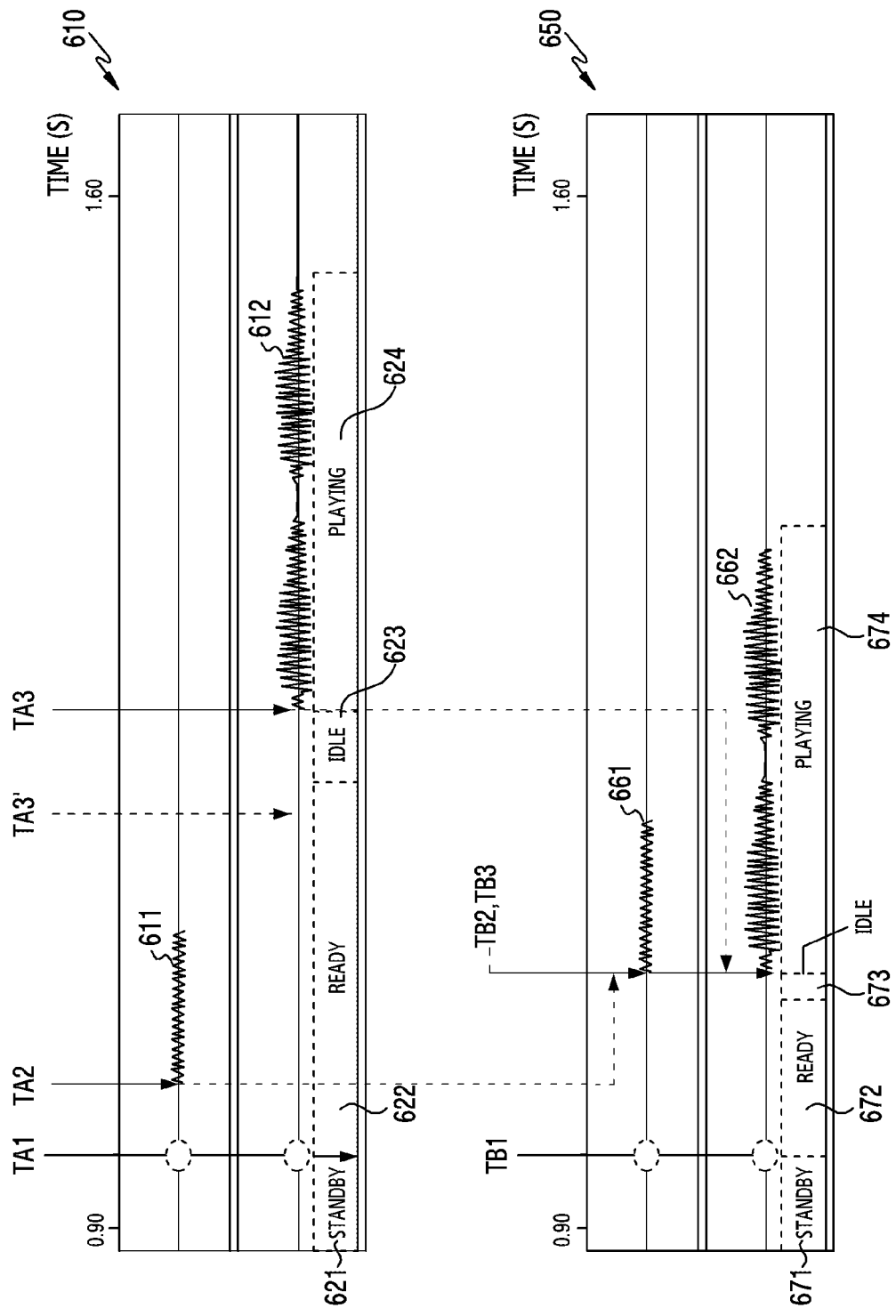
FIG. 6 is a timing diagram illustrating example output results of vibration and sound in an electronic device according to various embodiments.

FIG. 6 is a timing diagram illustrating example output results of vibration and sound in an electronic device according to various embodiments.

Reference numeral 610 is a timing diagram illustrating output results of vibration and sound in the electronic device according to the comparative example. Reference numeral 611 denotes an output waveform of vibration. Reference numeral 612 denotes an output waveform of sound.

In the timing diagram of 610, TA1 is a first timing at which an event occurs. TA2 is a second timing that is a vibration start timing. TA3 or TA3' is a third timing that is a sound start timing.

According to the comparative example, since the vibration start timing TA2 and the sound start timing TA3 or TA3' are different, a deviation between the two timings may appear, and thus the vibration and sound may be output asynchronously. The time required for sound output (e.g., 200 ms to 300 ms) may correspond to a time interval from the first timing TA1 that is an event occurrence timing to the third timing TA3 or TA3' that is the sound start timing. The time required for the vibration output (e.g., 50 ms) may correspond to a time interval from the first timing TA1 that is the event occurrence timing to the second timing TA2 that is the vibration start timing. The time required for outputting the vibration may be shorter than the time required for outputting the sound.

A deviation (e.g., 100 ms) between sound output timings TA3 and TA3' may also exist. For example, when the electronic device is in a first state in which music is not being played, the sound output timing may be TA3. When the electronic device is in a second state in which music is being played, the sound output timing may be TA3', which may be earlier than in the first state.

The sound output progress state of the electronic device may be divided into a standby state 621, a ready state 622, an idle state 623, and a playing state 624. As illustrated, when an event occurs, the output of vibration and the output of sound may be sequentially controlled. In this case, a section in the ready state 622 and the idle state 623 before the sound output may be lengthened, so that an output deviation between the vibration and the sound may appear.

According to the comparative example, when an event occurs, vibration and sound may be output separately or may be individually controlled without mutual interaction. Since the time required for vibration output (e.g., 50 ms) is shorter than the time required for sound output (e.g., 200 to 300 ms) by a predetermined value, a large output deviation may occur. A deviation between the vibration output timing TA2 and the sound output timing TA3 or TA3' may occur.

As shown, when an event occurs at the first timing TA1, vibration may be output at the second timing TA2 (e.g., within TA1+50 ms), and then sound may start at the third timing TA3 or TA3'. A certain deviation may exist between a vibration end timing and the sound start timing TA3, or the vibration and the sound may be output asynchronously.

Reference numeral 650 is a timing diagram illustrating output results of vibration and sound in the electronic device 200 according to an embodiment. Reference numeral 661 denotes an output waveform of vibration. Reference numeral 662 denotes an output waveform of sound.

In the timing diagram of reference numeral 650, TB1 is a first timing that is a timing of the occurrence of an event. TB2 is a second timing that is a vibration output timing (or a vibration start timing). TB3 is a third timing that is a sound output timing (or a sound start timing).

When an event occurs at the first timing TB1, vibration may be output from a second timing TB2 after being delayed by a designated offset (e.g., 70 ms to 80 ms) from the second timing TA2 of reference numeral 610. Sound may be output simultaneously with the vibration. The output of sound may be started at the third timing TB3 in synchronization with the second timing TB2. The third timing TB3 may be substantially the same timing as the second timing TB2 (e.g., within TB2±30 ms).

According to an embodiment, when the event occurs, the vibration and the sound may be controlled to interact with each other. The electronic device 200 may control in such a manner that there is no substantial deviation between the vibration output timing TB2 and the sound output timing TB3.

The sound output progress state of the electronic device 200 may be divided into a standby state 671, a ready state 672, an idle state 673, and a playing state 674.

For example, the standby state 671 may be a state before the occurrence of the event. The ready state 672 and the idle state 673 may be states in which the output of sound is reserved. The idle state 673 may exist within a predetermined time (e.g., 10 ms) or may not exist substantially. The playing state 674 may be a state in which sound is output.

For example, the standby state 671 may be a state in which sound data (or sound stream) is provided and a hardware element (e.g., the sound module 250 and the speaker 251) for sound output is deactivated. The ready state 672 may be a state in which sound data is provided and a hardware element for sound output is deactivated, but an arbitrary operation is started (e.g., an event occurs or a power saving mode is released) in the electronic device 200. The idle state 673 may be a state in which sound data is provided and a hardware element for sound output is activated. The playing state 674 may be a state in which sound data is provided, a hardware element for sound output is activated, and the electronic device 200 is operating (e.g., sound is being played).

According to an embodiment, when an event occurs, the outputs of vibration and sound may be controlled in parallel. A section corresponding to the ready state 672 and/or the idle state 673 may be shortened, so that an output deviation between the vibration and the sound may be resolved.

According to an embodiment, the electronic device 200 may delay the vibration output timing by allocating a delay time (e.g., 70 ms to 80 ms) to the vibration output for synchronization. For example, the vibration output timing may be shifted (delayed) from the second timing TA2 of reference numeral 610 to the second timing TB2 of reference numeral 650.

The electronic device 200 may advance the sound output timing TB3 to reduce the time required for sound output. For example, the sound output timing may be shifted (advanced) from the third timing TA3 or TA3' of reference numeral 610 to the third timing TB3 of reference numeral 650.

According to an embodiment, when an event occurs at the first timing TB1, sound may be output at a timing advanced by a designated offset. For example, sound may be output starting from the third timing TB3 of reference numeral 650 by advancing the corresponding timing by a designated offset (e.g., 90 ms to 100 ms) from the third timing TA3 or TA3' of reference numeral 610. For example, the electronic device 200 may open a sound output path (e.g., operation 430 of FIG. 4 or operation 522 of FIG. 5) in order to advance the sound output timing TB3, or may change (e.g., operation 430 of FIG. 4 or operation 523 of FIG. 5) the sound output path from a first path for non-fast output of the sound to a second path for fast output of the sound. For example, the sound output timing may be shortened by about 100 ms through operation 522 of FIG. 5 of opening the sound output path, or the sound output timing may be shortened by about 90 ms through operation 523 of FIG. 5 changing the sound output path. For example, the second path for fast output may be a path obtained by skipping at least a portion of the first path for non-fast output or shortening the first path. For another example, the second path may include a different component from the first path.

Accordingly, the vibration and the sound, which are different types of interfaces, may be synchronized when an event occurs.

Figure 7:
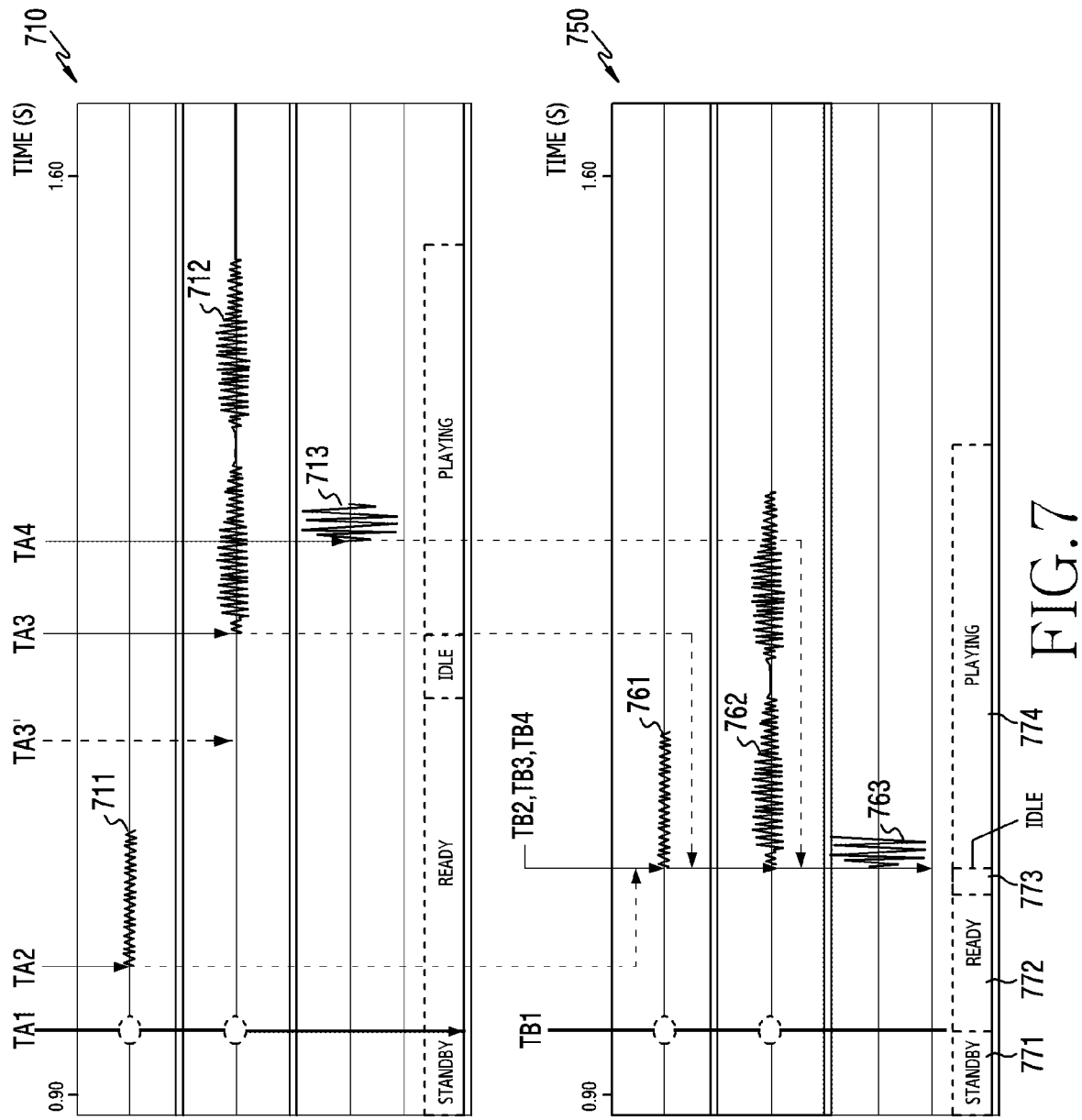
FIG. 7 is a timing diagram illustrating example output results of vibration, sound, and visual elements in an electronic device according to various embodiments.

FIG. 7 is a timing diagram illustrating example output results of vibration, sound, and visual elements in an electronic device according to various embodiments.

Reference numeral 710 is a timing diagram illustrating output results of vibration, sound, and visual element in an electronic device according to the comparative example. Reference numeral 711 denotes an output waveform of vibration. Reference numeral 712 denotes an output waveform of sound. Reference numeral 713 denotes an output waveform of a signal for the visual element.

In the timing diagram of reference numeral 710, TA1 is a first timing at which an event occurs. TA2 is a second timing that is a vibration output timing (or a vibration start timing). TA3 or TA3' is a third timing that is a sound output timing (or a sound start timing). TA4 is an output timing of the visual element.

According to the comparative example, since the vibration output timing TA2, the sound output timing TA3 or TA3', and the visual element output timing TA4 are different from one another, a deviation between the corresponding timing may appear, and thus the vibration, the sound, and the visual element may be output asynchronously.

The electronic device may require a long time compared to vibration for processing and/or outputting sound data. The time required for sound output (e.g., 200-300 ms) may be longer than the time required for vibration output (e.g., 50 ms). In the timing diagram of 710, the time required for sound output (e.g., 200 to 300 ms) may correspond to a time interval from the first timing TA1 to the third timing TA3 or TA3'.

A deviation between the sound output timings TA3 and TA3' may also exist according to the operating state of the electronic device (e.g., a music playing state or a non-playing state).

The electronic device may sequentially control the outputs of the sound and the visual element when an event occurs. The electronic device may output the visual element at the fourth timing TA4 having a predetermined deviation from the third timing TA3 which is the sound output timing.

According to the comparative example, as illustrated, there may be a large deviation between the vibration output timing TA2, the sound output timing TA3, and the visual element output timing TA4.

As illustrated, when an event occurs at the first timing TA1, vibration may start at the second timing TA2 (within TA1+50 ms) and then sound may start at the third timing TA3 or TA3'. In addition, the visual element may be output at the fourth timing TA4 (within TA3+100 ms) after the sound starts. A deviation may exist between the vibration output timing TA2, the sound output timing TA3 or TA3', and the visual element output timing TA4.

Reference numeral 750 is a timing diagram illustrating output results of vibration, sound, and visual element in the electronic device 200 according to an embodiment. Reference numeral 761 denotes an output waveform of vibration. Reference numeral 762 denotes an output waveform of sound. Reference numeral 763 denotes an output waveform of a visual element (or a visual signal).

The sound output progress state of the electronic device 200 may be divided into a standby state 771, a ready state 772, an idle state 773, and a playing state 774. For example, the standby state 771, the ready state 772, the idle state 773, and the playing state 774 of FIG. 7 may correspond to the standby state 671, the ready state 672, the idle state 673, and the playing state 674 of FIG. 6, respectively.

According to an embodiment, when an event occurs at a first timing TB1, vibration may be delayed by a designated offset (e.g., 70 ms to 80 ms) from the second timing TA2 of reference numeral 710, and may be output starting from a second timing TB2. Sound and a visual element may be output simultaneously with vibration. In synchronization with the second timing TB2, the output of the sound may start at a third timing TB3 and the output of the visual element may start at a fourth timing TB4. The third timing TB3 and the fourth timing TB4 may be substantially the same as the second timing TB2 (e.g., within TB2±30 ms).

The time required to output vibration may correspond to a time interval from the first timing TB1 to the second timing TB2. The required time to output sound may correspond to a time interval from the first timing TB1 to the third timing TB3. The time required to output the visual element may correspond to a time interval from the first timing TB1 to the fourth timing TB4.

The electronic device 200 may control the time required to output vibration, sound, and visual element TB1 to TB2, TB1 to TB3, and TB1 to TB4 to be substantially the same.

According to an embodiment, when an event occurs, the outputs of vibration, sound, and visual element may be controlled in parallel. A section in which the electronic device 200 is in the ready state 772 and/or the idle state 773 may be shortened, so that an output deviation between the vibration, the sound, and the visual element may be resolved.

According to an embodiment, the electronic device 200 may delay the vibration output timing by allocating a delay time (e.g., 70 ms to 80 ms) to the vibration output. For example, the electronic device 200 may shift (e.g., delay) the vibration output timing TB2 from the second timing TA2 of reference numeral 710 to the second timing TB2 of reference numeral 750, and thus the vibration output timing TB2 may be synchronized with the sound output timing TB3 and the visual element output timing TB4.

In addition, the electronic device 200 may advance the sound output timing TB3 to correspond to the vibration output timing TB2. The electronic device 200 may open a sound output path to advance the sound output timing TB3 or may change the sound output path from a first path for non-fast output of sound to a second path for fast output of sound. For example, the electronic device 200 may shift (e.g., advance) the sound output timing TB3 from the third timing TA3 of reference numeral 710 to the third timing TB3 of reference numeral 750, and thus the sound output timing TB3 may be synchronized with the vibration output timing TB2 and the visual element output timing TB4.

In addition, the electronic device 200 may shift the output timing TB4 of the visual element to correspond to the sound output timing TB3. The sound output timing TB3 and the visual element output timing TB4 may be substantially the same or may be within a certain offset (e.g., ±30 ms). For example, the output timing TB4 of the visual element may correspond to a timing of generating a triggering signal for outputting the visual element. The electronic device 200 may shift (e.g., advance) the timing of generating the triggering signal for outputting the visual element from the fourth timing TA4 of 710 to the fourth timing TB4 of 750.

Accordingly, as illustrated, a deviation between the vibration output timing, the sound output timing, and the visual element output timing may be improved. Synchronization between different types of interfaces, the vibration, the sound, and the visual element, may be implemented when an event occurs.

The synchronization operation among the vibration, the sound, and the visual element that are different types of interfaces in the electronic device are not limited to the illustrated vibration output timing, sound output timing, and visual element output timing. According to an embodiment, when the vibration output timing occurs later than the sound output timing, the sound output timing may be shifted (e.g., delayed) to match the vibration output timing. For example, when the vibration output timing is delayed due to the preparation operation of the haptic module 240, a section in the idle state 773 may be increased to achieve synchronization of the vibration output timing and the sound output timing. In an embodiment, the preparation operation of the haptic module 240 may include delaying signal processing from at least a portion of the system vibrator 344 or the vibration service 343 of FIG. 3 to the interaction module 300.

FIG. 8 is a signal flow diagram illustrating an example operation of switching a sound output mode in an electronic device according to various embodiments. For example, the operations of FIG. 8 may correspond to operation 430 of FIG. 4 or operation 523 of FIG. 5.

In an embodiment, the electronic device 200 may output sound using one of a first path 810 and a second path 820.

The first path 810 may be a non-fast output path. The second path 820 may be a fast output path of sound. For example, the second path 820 may be a path obtained by skipping at least a portion (e.g., the audio flinger 802 of FIG. 8) of the first path 810 or shortening the non-fast output path. As another example, the second path 820 may include a different component (e.g., the second buffer 825 of FIG. 8 which is a buffer for fast output) from the first path 810 for fast output of sound.

The electronic device 200 may reduce the time required for sound output by changing the first path 810 to the second path 820 in order to synchronize the sound with the vibration and/or the visual element.

In the example of FIG. 8, the first path 810 may include a media decoder 801, an audio flinger 802, an audio HAL 803, and an audio object 804. For example, the audio object 804 may correspond to a hardware element (e.g., the sound module 250 of FIG. 2 or the speaker 251 of FIG. 3) for sound output. The media decoder 801, the audio flinger 802, and the audio HAL 803 may be software and/or firmware elements, and may process sound and may output the processed sound through the audio object 804. The first path 810 may include a first buffer 815. The first buffer 815 may be a non-fast output buffer.

The second path 820 may be a path obtained by skipping at least a portion of the first path 810 (e.g., the audio flinger 802) or a path obtained by shortening the first path 810.

The second path 820 may include a second buffer 825. The second buffer 825 may be a buffer for fast output.

In the case of the first path 810, the logic of a resampler 811 and an effector 812 may be executed at the audio flinger 802 stage, and it may take time to execute the logic. In addition, the size (e.g., 3,840 frames {48 kHz×20 ms×4}) of the first buffer 815 storing sound data in the first path 810 may be larger than the size (e.g., 384 frames {48 kHz×4 ms×2}) of the second buffer 825 used in the second path 820. For this reason, in the case of the non-fast output using the first path 810, a relatively long time may be required for processing and/or outputting sound data compared to the fast output using the second path 820.

When the sound output path is changed from the first path 810 to the second path 820, the logic execution time of the resampler 811 and the effector 812 and/or the logic execution time according to the buffer size may be shortened.

The audio flinger 802 may include the resampler 811 and the effector 812. The audio HAL 803 may correspond to the audio HAL 331 of FIG. 2. The audio object 804 may correspond to the sound module 250 of FIG. 2 or the speaker 251 of FIG. 3.

In an embodiment, the audio object 804 may include the first buffer 815 and the second buffer 825. The size and/or latency of the second buffer 825 may be smaller than that of the first buffer 815. For example, the size and/or latency of the first buffer 815 may be twice or more and 10 times or less compared to the size and/or latency of the second buffer 825. When the size of the second buffer 825 is less than twice the size of the first buffer 815, the time reduction effect may be reduced. When the size of the second buffer 825 exceeds 10 times the size of the first buffer 815, resource consumption may be excessive.

In the example of FIG. 8, the size of the first buffer 815 may be 3,840 frames (48 kHz×20 ms×4). When the first buffer 815 is empty, one cell (20 ms×1) must be filled so that the corresponding output may be performed. In this case, the latency of the first buffer 815 used in the first path 810 for the non-fast output may be 20 ms. The size of the second buffer 825 may be 384 frames (48 kHz×4 ms×2). When the second buffer 825 is empty, one or two cells (4 ms×2) must be filled so that the corresponding output may be performed. In this case, the latency of the second buffer 825 used in the second path 820 for fast output may be 4 ms or 8 ms.

During the non-fast output, sound may be output through the first path 810. For example, the first path may be a path including the audio flinger 802. The audio flinger 802 may be for resampling of sound data and/or for effect processing. Sound data may be transmitted from the media decoder 801 to the resampler 811. The resampler 811 may resample the sound data of a first frequency (e.g., 44.1 kHz) transmitted from the media decoder 801 to a second frequency (e.g., 48 kHz) and may transmit the resampled sound data to the effector 812. The effector 812 may effect-process (e.g., sound alive or sound booster) the received sound data, and may store the processed sound data in the first buffer 815. For example, when the first buffer 815 is empty, sound data may be output as one cell of the first buffer 815 is filled. Accordingly, it may take 20 ms or more for sound output.

During the fast output, sound may be output through the second path 820. For example, the fast sound output path may be a path that skips the audio flinger 802. The sound data may be directly transmitted from the media decoder 801 to the second buffer 825 without passing through the audio flinger 802. For example, when the second buffer 825 is empty, sound data may be output as one or two cells of the second buffer 825 are filled. Accordingly, it may take 4 ms or 8 ms or more for sound output.

When the second path 820 is used, the time required for sound output may be shortened compared to the first path 810, and thus the sound output timing may be advanced.

For example, when the sound output path is changed from the first path 810 for non-fast output to the second path 820 for fast output, the time required for sound output may be reduced by a certain value (e.g., 90 ms) or more.

In an embodiment, the electronic device 200 may change the sound output mode from a first mode to a second mode in response to the event. For example, the second mode may be for changing the sound output path from the first path for non-fast output to the second path for fast output. As the sound output mode is changed to the second mode, the sound output path may be changed from the first path 810 for non-fast output to the second path 820 for fast output.

Figure 9:
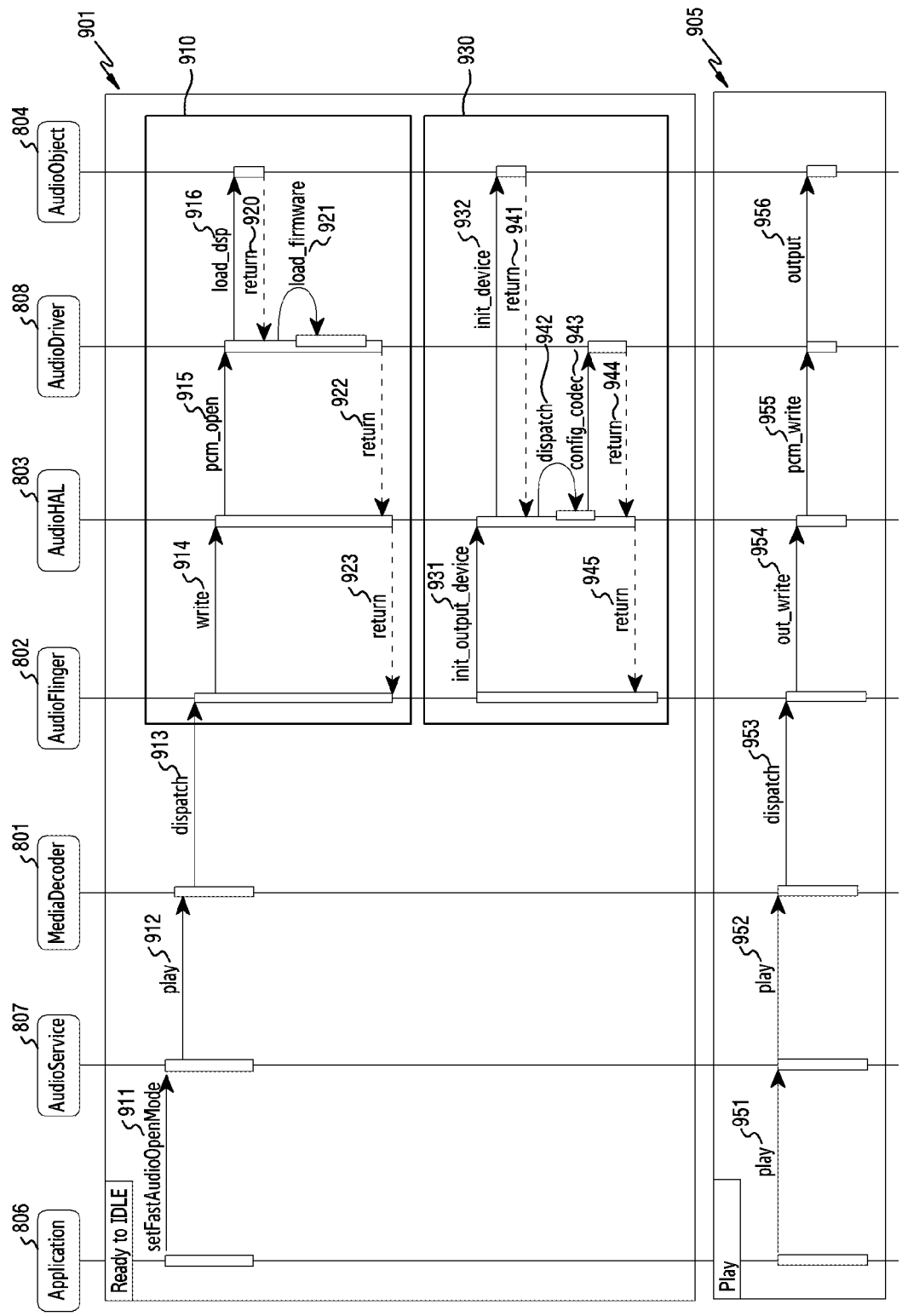
FIG. 9 is a signal flow diagram illustrating an example operation of opening a sound output path in an electronic device according to various embodiments.

FIG. 9 is a signal flow diagram illustrating an example operation of opening a sound output path in an electronic device according to various embodiments. For example, the operation of FIG. 9 may correspond to operation 430 of FIG. 4 or operation 522 of FIG. 5.

In an embodiment, the electronic device 200 (or the sound output path of the electronic device 200) may include an application 806, an audio service 807, a media decoder 801, an audio flinger 802, an audio HAL 803, an audio driver 808, and an audio object 804.

For example, the application 806 may be included in the application layer 350 of FIG. 3. The application 806 may correspond to the applications 351 and 355 of FIG. 3. The audio service 807 may correspond to the audio service 341 of FIG. 3. The media decoder 801 and the audio flinger 802 may be included in the interaction module 300 of FIG. 3. The audio HAL 803, the audio driver 808, and the audio object 804 may correspond to the audio HAL 331, the audio driver 321, and the speaker 251 of FIG. 3, respectively.

The electronic device 200 may perform operations 901 and 905.

Operation 901 may be a preliminary operation for playing sound. For example, the electronic device 200 may perform operation 901 in a state (e.g., the ready state 672 and/or the idle state 673 of FIG. 6) before playing sound.

Operation 905 may be a sound play operation. For example, the electronic device 200 may perform operation 905 in the playing state (e.g., the playing state 674 of FIG. 6).

When the sound play preliminary operation 901 is performed in advance, the sound play operation 905 may be immediately performed. Accordingly, the time (e.g., 100 ms) for the sound play preliminary operation 901 may be unnecessary, and the required time for sound output may be shortened, so that the synchronization performance between the sound and other interfaces (the vibration and/or the visual element) may be improved.

Operation 901 may include operations 910 and 930. Operation 910 may be an operation of opening a sound output path for sound output. Operation 930 may be an operation of activating the audio object 804, which is a hardware element, for sound output. As operation 930 is performed, the audio object 804 may be switched from the inactive state to the active state.

According to an embodiment, by performing operations 910 and 930 in parallel, both corresponding operations may be completed within a predetermined time (e.g., within 50 ms).

Referring to FIG. 9, in operation 911, the application 806 may transmit a command (setFastAudioOpenMode) for changing the sound output mode from the first mode for non-fast output to the second mode for fast output to the audio service 807. The command (setFastAudioOpenMode) may be an open command for the sound output path.

In operation 912, the audio service 807 may transmit a play command to the media decoder 801.

In operation 913, the media decoder 801 may transmit a dispatch command to the audio flinger 802.

Operation 910 may be performed in response to the dispatch command

Operation 910 may include operations 914 to 923.

In operation 914, the audio flinger 802 may transmit a write command to the audio HAL 803. In operation 915, the audio HAL 803 may transmit a path open command (pcm_open) to the audio driver 808. In operation 916, the audio driver 808 may transmit a loading command (load_dsp) to the audio object 804. In operation 920, the audio object 804 may configure a buffer to be used as a fast output buffer (e.g., the second buffer 825 of FIG. 8) in response to the loading command (load_dsp), and then may transmit a return response to the audio driver 808. In operation 921 and operation 922, the audio driver 808 may perform a loading operation of loading firmware functions (or functions) necessary for sound output according to the return response, and then may transmit the return response to the audio HAL 803. In operation 923, the audio HAL 803 may transmit the return response to the audio flinger 802.

The electronic device 200 may perform operation 930. Operation 930 may include operations 931 to 945.

In operation 931, the audio flinger 802 may transmit a device output initialization command (init_output_device) to the audio HAL 803. In operation 932, the audio HAL 803 may transmit an output initialization command (init_device) to the audio object 804. In operation 941, the audio object 804 may transmit the return response to the audio HAL 803 after transitioning from the inactive state to the active state. In operation 942, the audio HAL 803 may perform a dispatch operation, and in operation 943, the audio HAL 803 may transmit a codec configuration command (config_codec) to the audio driver 808. In operation 944, the audio driver 808 may transmit the return response to the audio HAL 803. In operation 945, the audio HAL 803 may transmit the return response to the audio flinger 802.

The electronic device 200 may perform operation 905 when an event occurs. Operation 905 may be a sound play operation.

In operations 951 and 952, a play command may be sequentially transmitted from the application 806 to the audio service 807 and the media decoder 801. In operation 953, the media decoder 801 may transmit a dispatch command to the audio flinger 802. In operation 954, the audio flinger 802 may transmit an output write command (out_write) for reading sound data stored in the buffer to the audio HAL 803. In operation 955, the audio HAL 803 may transmit a write command (pcm_write) to the audio driver 808. In operation 956, the audio driver 808 may transmit an output command to the audio object 804. The audio object 804 may output (or play) sound in response to the output command For example, for synchronization, the electronic device 200 may perform the sound play preliminary operation 901 in advance in a pre-event step before the occurrence of the event, thereby reducing the time (e.g., 100 ms) required for the corresponding operation when the event occurs. The electronic device 200 may perform in advance operation 910 of opening the sound output path and/or operation 930 of activating the audio object 804 in a section before the sound output time. By opening the sound output path, which is an essential process for playing the sound, and/or performing the hardware activation logic in advance, the corresponding operation may be omitted when actually playing the sound.

Figure 10:
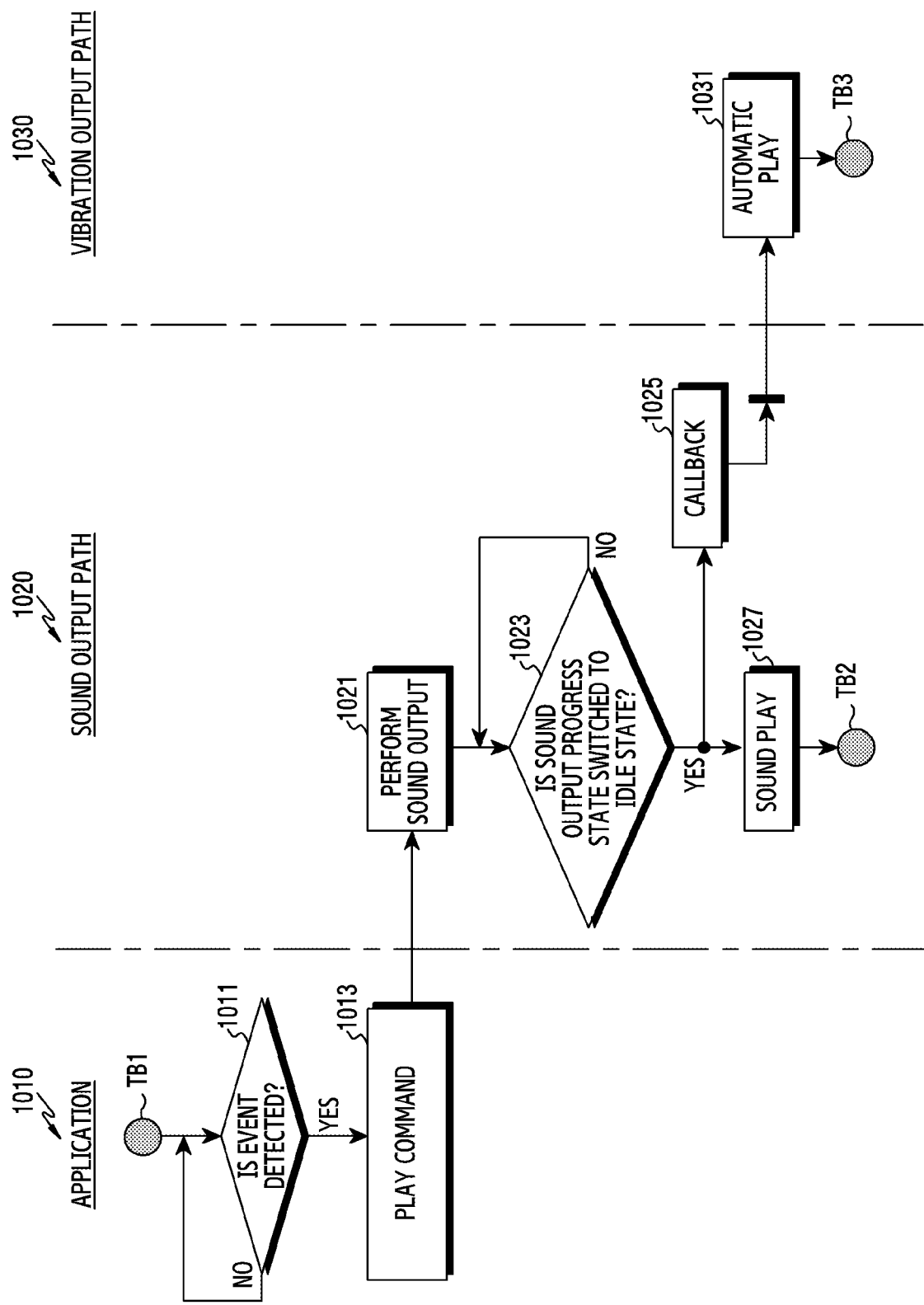
FIG. 10 is a flowchart illustrating an example operation of delaying vibration in an electronic device according to various embodiments.

FIG. 10 is a flowchart illustrating an example operation of delaying vibration in an electronic device according to various embodiments. For example, the operation of FIG. 10 may correspond to operation 420 of FIG. 4 or operation 521 of FIG. 5.

In the example of FIG. 10, operation 1010 may be performed through an application (e.g., application 351 of 355 of FIG. 3) of the electronic device 200. Operation 1020 may be performed through a sound output path. For example, the sound output path may correspond to a path including at least some of the audio manager 342, the audio service 341, the interaction module 300, the audio HAL 331, and the audio driver 321 and the speaker 251 of FIG. 3, or the second path 820 of FIG. 8. Operation 1030 may be performed through a vibration output path. For example, the vibration output path may be a path including at least some of the system vibrator 344, the vibration service 343, the interaction module 300, the vibration HAL 333, the vibration driver 323 of FIG. 3, and the motor 241 of FIG. 3.

A first timing TB1 may be a timing at which an event occurs.

In operation 1011, the electronic device 200 may identify whether an event occurs through the application. For example, the event may be an event for outputting vibration and sound. For example, the event may be one of an event (e.g., a touch event, a gesture event, or a scroll event) according to a user input, an event (e.g., a charger connection event) according to a state change of the electronic device 200, or a cues event (e.g., an error event or a notification event). In operation 1011, when the application of the electronic device 200 detects the event, operation 1013 may be performed. In an embodiment, when the application of the electronic device 200 does not detect the event in operation 1011, operation 1011 may be repeatedly performed or it is possible to wait for the event to occur.

In operation 1013, the application of the electronic device 200 may transmit a play command to the sound output path.

Operation 1020 may include operations 1021, 1023, 1025, and 1027.

In operation 1021, the sound output path of the electronic device 200 may perform a sound output procedure in response to the play command of the application. For example, according to the progress of the sound output procedure, the sound output progress state may be sequentially switched to the standby state, the ready state, the idle state, and the playing state.

In operation 1023, the electronic device 200 may identify whether the sound output progress state is switched to the idle state (e.g., the idle state 673 of FIG. 6 or the idle state 773 of FIG. 7) through the sound output path.

For example, the idle state is a state immediately before the playing state, and may correspond to a state in which a sound output preliminary operation (e.g., operation 901 { the sound play preliminary operation} of FIG. 9) is completed. For another example, in the idle state, sound data may be provided (e.g., stored in the second buffer 825 of FIG. 8) and the hardware element for sound output (e.g., the sound module 250 or the speaker 251) may be activated.

When the sound output progress state is switched to the idle state, the sound output path may transmit a callback to the vibration output path in operation 1025, thereby indicating that the sound output preliminary operation has been completed.

In an embodiment, when switching to the idle state, operation 1027 may be performed. In an embodiment, when the sound output progress state is not switched to the idle state, the electronic device 200 may repeatedly perform operation 1023 or wait for the transition to the idle state. For example, the electronic device 200 may identify the sound output progress state (check for a stream status), and may identify whether the sound output progress state is switched to the idle state. For example, when the sound output progress state is switched to the idle state, a callback may be transmitted from the sound output path (e.g., the audio manager 342) responsible for sound output (or play) to the vibration output path (e.g., the vibration service 343) responsible for vibration output. The vibration output path (e.g., the vibration service 343) may synchronize the output timing of the sound and the vibration by playing the vibration when the sound output progress state is switched to the idle state in response to the callback.

In operation 1027, the sound output path may play (or output) sound corresponding to the event.

In operation 1031, as the callback is transmitted from the sound output path, the vibration output path of the electronic device 200 may play (or output) vibration corresponding to the event.

The second timing TB2 may correspond to the sound output timing. The third timing TB3 may correspond to the vibration output timing.

The electronic device 200 may control the second timing TB2 and the third timing TB3 to substantially the same timing (e.g., a designated offset {e.g. within±30 ms}) in a manner that the callback according to the sound output progress state is transmitted from the sound output path to the vibration output path. For this reason, the synchronization performance between the sound and the vibration may be improved.

FIGS. 11A, 11B, 11C, 11D and 11E are diagrams illustrating an example method of providing a user interface of an electronic device according to various embodiments.

FIGS. 11A, 11B, 11C, 11D and 11E (which may be referred to hereinafter as FIGS. 11A to 11E) may correspond to a method of providing a user interface of a smart phone type electronic device. Events illustrated in FIGS. 11A to 11E may correspond to user input events or cues events.

Figure 11A:
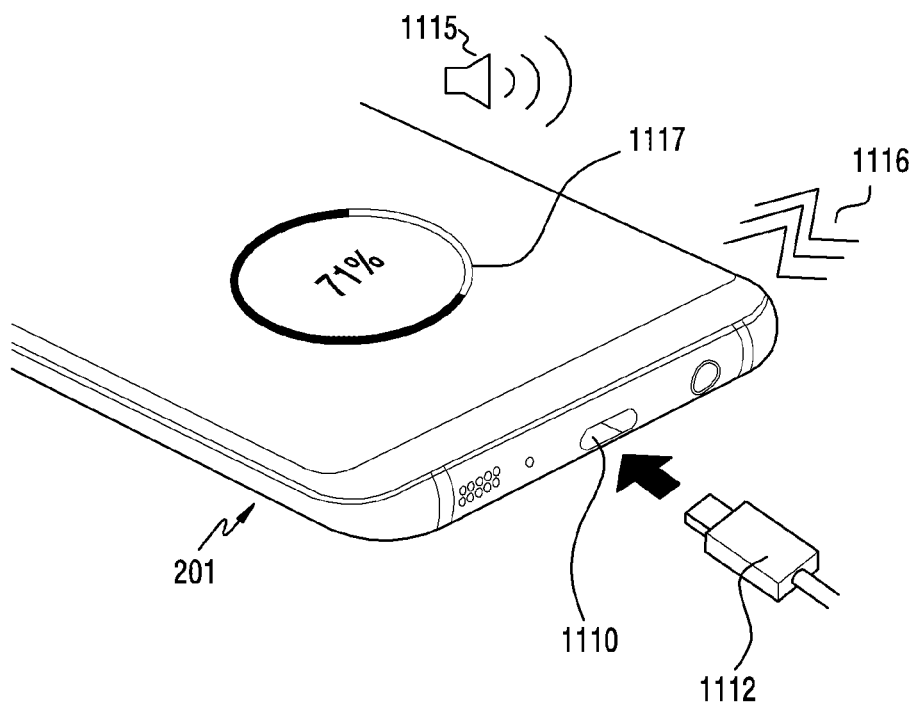
FIGS. 11A, 11B, 11C, 11D and 11E are diagrams illustrating an example method of providing a user interface of an electronic device according to various embodiments.

FIG. 11A illustrates an example method of providing a user interface according to the occurrence of a cues event (e.g., a charger connection event).

The electronic device 200 according to an embodiment may be a smart phone type electronic device 201.

In FIG. 11A, the smart phone type electronic device 201 may detect the occurrence of the charger connection event as a charger cable 1112 is connected to a charging port 1110. The charger connection event may be an event for the output of vibration, sound, and a visual element. The charger connection event may be a wireless connection method as well as the illustrated wired connection method.

When the charger connection event occurs, the electronic device 201 may synchronize and output a vibration 1116, a sound 1115, and a visual element 1117 indicating the occurrence of the charger connection event.

The electronic device 201 may change a sound output mode from a first mode to a second mode for fast output in response to the charger connection event.

For example, the electronic device 201 may activate the sound module (e.g., the sound module 250 of FIG. 2 or the speaker 251 of FIG. 3) by opening the sound output path at a first timing at which the charger connection event occurs, and may then output the sound 1115 through the activated sound module. The electronic device 201 may output the vibration 1116 and the visual element 1117 together in response to the sound output timing.

Figure 11B:
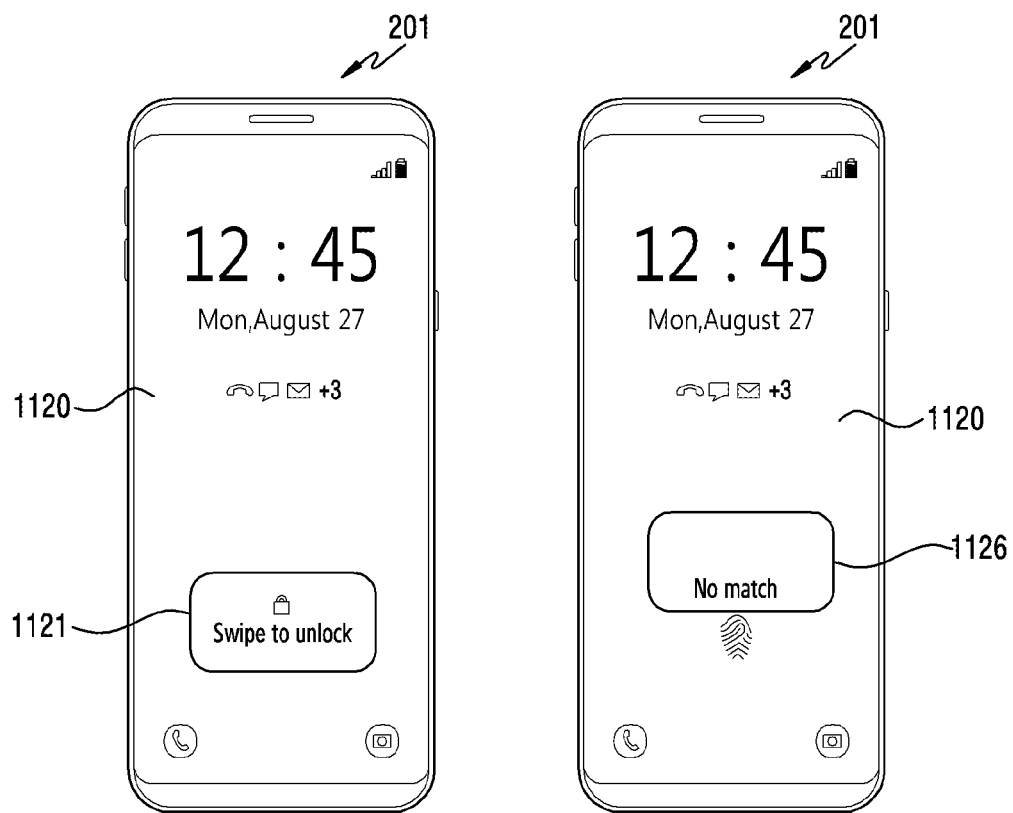

FIG. 11B illustrates an example method of providing a user interface according to a cues event (e.g., an authentication error event).

In FIG. 11B, the smart phone type electronic device 201 may display a lock screen 1120. The lock screen 1120 may include a biometric authentication window 1121.

When the user performs an action for authentication (e.g., fingerprint input), a window 1126 indicating an authentication failure may be displayed on the lock screen 1120.

The electronic device 201 may provide a witty user interface so that the user does not accept this situation inconveniently. In response to the authentication error event, the electronic device 201 may synchronize the vibration (e.g., a vibration pattern output simultaneously with a sound effect pattern), the sound (e.g., an interesting sound effect pattern), and the visual element (e.g., an animation tailored to the sound effect pattern or a window 1126 on the lock screen 1120) each indicating the authentication failure in response to the authentication error event, and may integrally output them, thereby implementing a harmonious interaction.

Figure 11C:
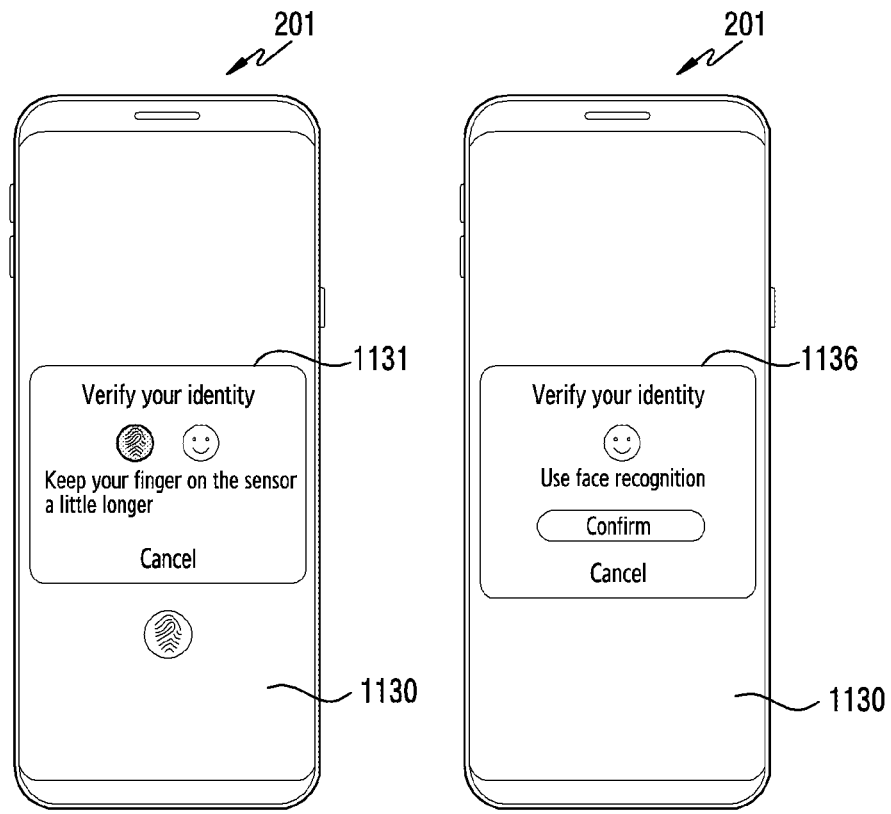

FIG. 11C illustrates an example method of providing a user interface according to a cues event (e.g., a guidance event).

In FIG. 11C, the smart phone type electronic device 201 may display a lock screen 1130. The lock screen 1130 may include a biometric authentication window 1131 (e.g., a fingerprint authentication menu and a face authentication menu).

When the user performs an action for authentication (e.g., fingerprint input), a window 1136 indicating an authentication failure and inducing another method of authentication (e.g., face authentication) may be displayed on the lock screen 1130.

When authentication fails, the electronic device 201 may provide a user interface that delivers a message in a witty and accurate manner through the window 1136 on the lock screen 1130 so that the user may take an appropriate attitude without accepting the situation inconveniently. The electronic device 201 may implement a harmonious interaction by integrally outputting synchronized vibration, sound, and visual element (e.g., the window 1136 on the lock screen 1130).

Figure 11D:
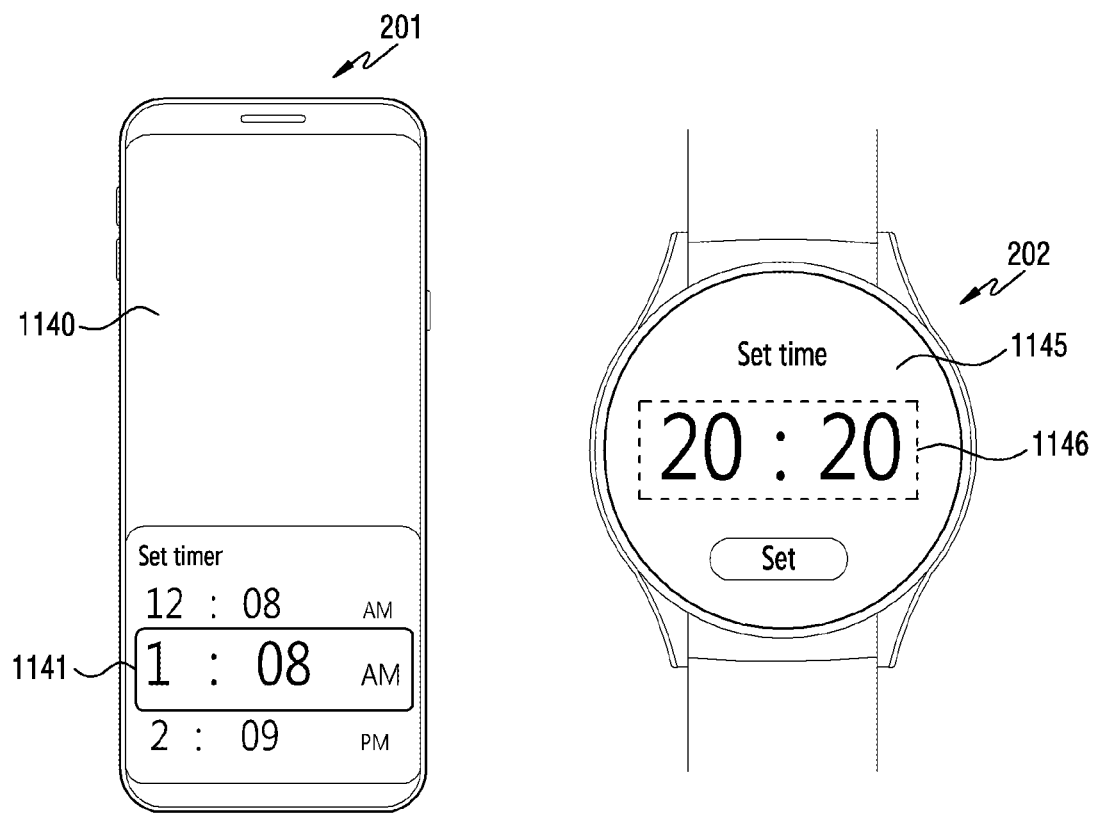

FIG. 11D illustrates an example method of providing a user interface according to a user input event (e.g., a scroll event).

The electronic device 200 according to an embodiment may be the smart phone type electronic device 201 or a smart watch type electronic device 202.

In FIG. 11D, the smart phone type electronic device 201 may display a first screen 1140. The first screen 1140 may include a time picker area 1141. The electronic device 201 may detect the occurrence of a scroll event according to a user's scrolling input to the time picker area 1141.

The smart watch type electronic device 202 may display a second screen 1145 including the time picker area 1146.

The occurrence of the scroll event may be detected according to the user's scrolling input to the time picker area 1141 or 1146. The scroll event may be an event for outputting vibration, sound, and a visual element.

For example, the electronic devices 201 and 202 may open the sound output path in advance for the purpose of fast output of sound before the occurrence of the scroll event. The electronic devices 201 and 202 may open the sound output path in advance in response to a pre-event of the scroll event. For example, the pre-event may be an event (e.g., an alarm app execution event) for displaying screens 1140 and 1145 (e.g., an alarm app execution screen) including the time picker areas 1141 and 1146.

As the sound output path is opened in advance before the scroll event occurs, changes according to the user's scroll input (e.g., at least some of a scroll direction, scroll speed, scroll distance, and/or scroll pressure) may be reflected in the output sound in real time.

In addition, it is possible to express realistic physical properties (acceleration, friction, sound, or dynamic tactile) or may deliver an interesting emotional experience through synchronization between the vibration, the sound, and the visual element during the user's scrolling action.

Figure 11E:
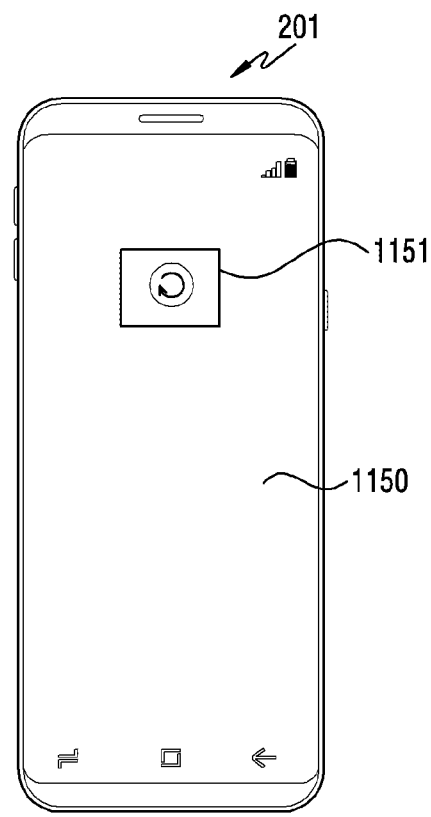

FIG. 11E illustrates an example method of providing a user interface according to a user input event (e.g., a touch event).

In FIG. 11E, the smart phone type electronic device 201 may display a screen 1150 including a refresh menu 1151.

When there is a user input (e.g., a touch or a tap) to the refresh menu 1151, the electronic device 201 may perform loading preparation in response to the user input and may then provide a clear user interface guiding the completion of loading preparation. The electronic device 201 may implement a harmonious interaction by integrally outputting the synchronized vibration, sound, and visual element.

Figure 12A:
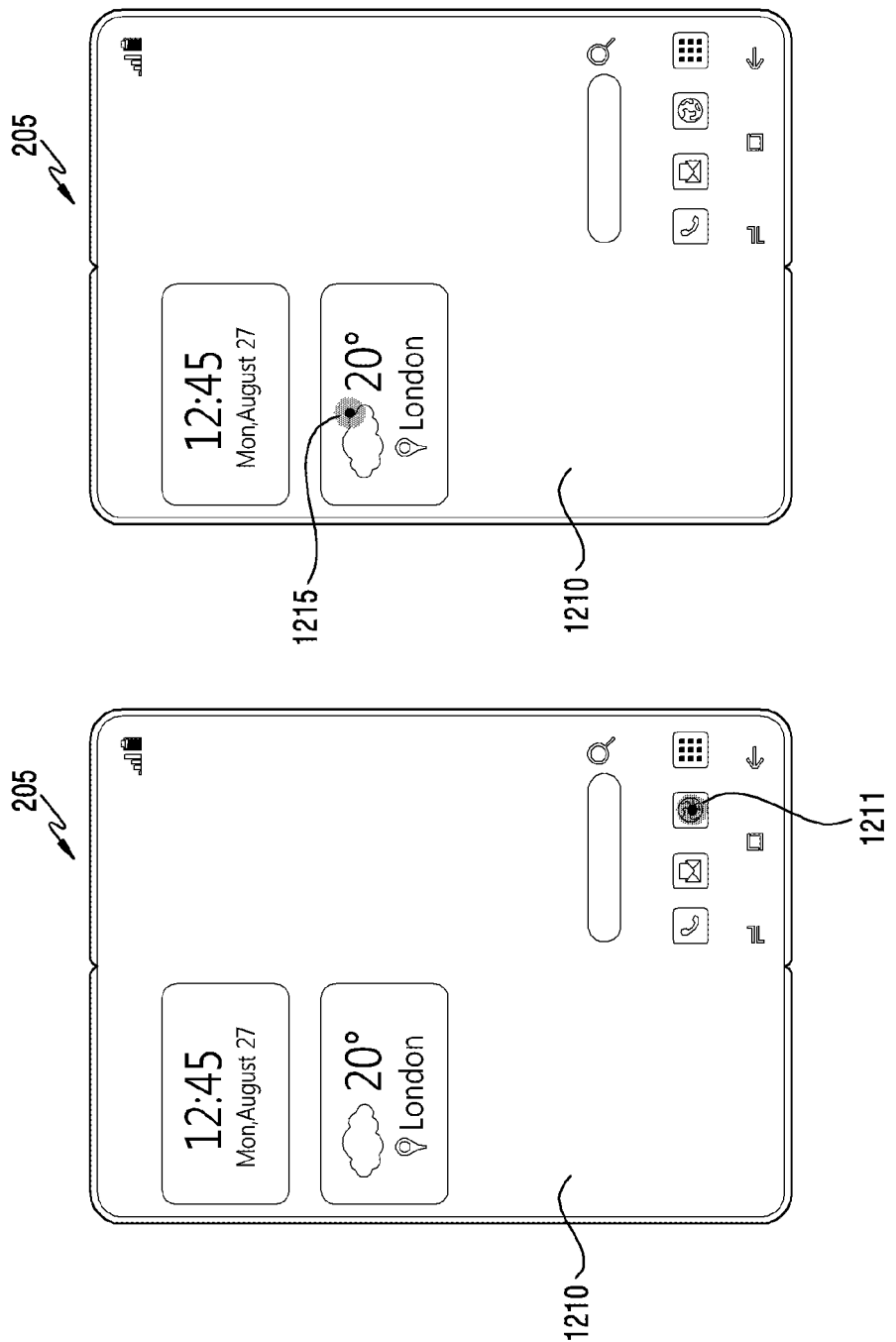
FIGS. 12A and 12B are diagrams illustrating an example method of providing a user interface of an electronic device according to various embodiments.
Figure 12B:
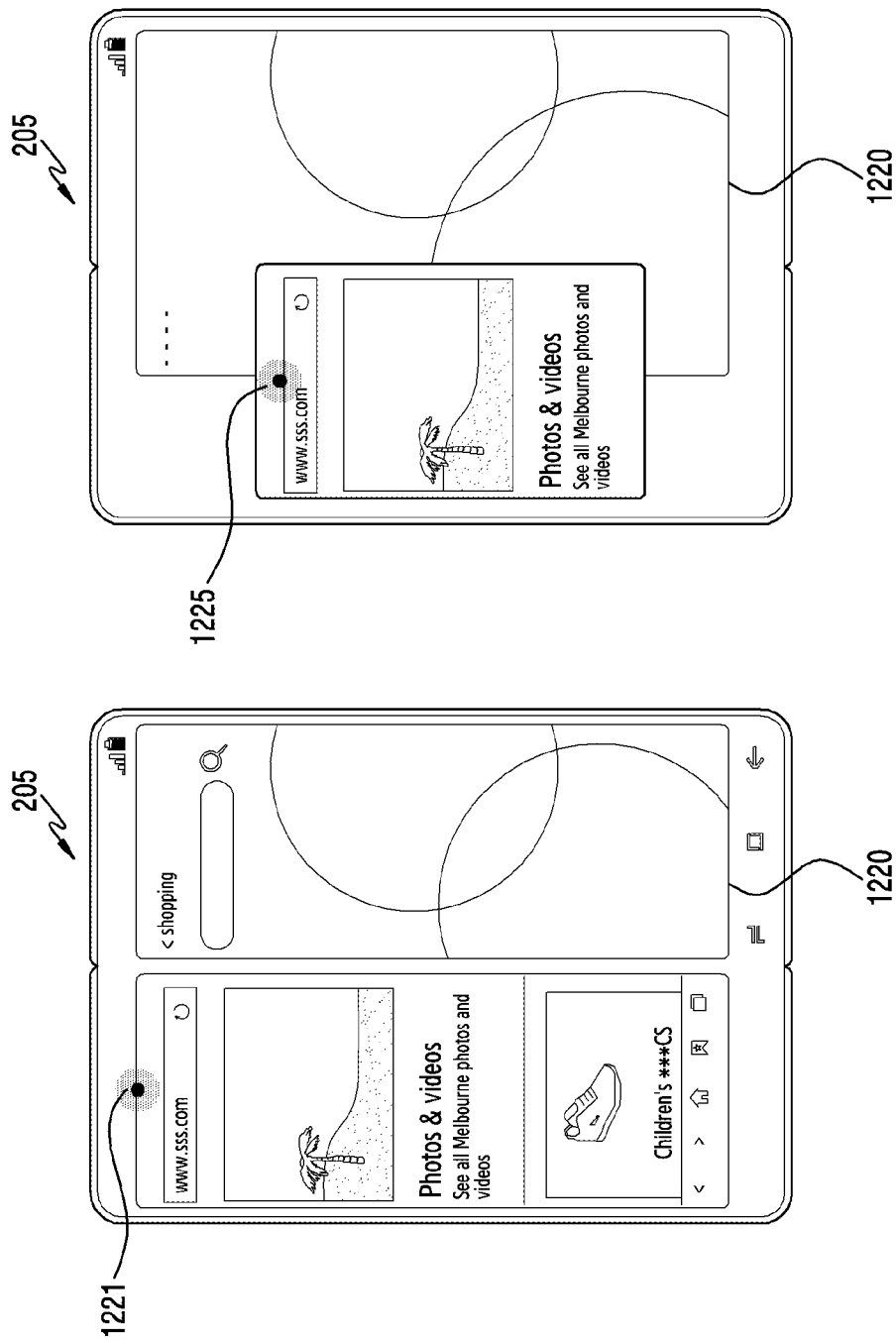

FIGS. 12A and 12B are diagrams illustrating an example method of providing a user interface of an electronic device according to various embodiments. FIGS. 12A and 12B may correspond to a method of providing a user interface of a foldable electronic device. Events illustrated in FIGS. 12A and 12B may correspond to user input events.

The electronic device 200 according to an embodiment may be a foldable electronic device 205.

In FIG. 12A, the foldable electronic device 205 may display a home screen 1210 including icons and/or widgets.

The foldable electronic device 205 may detect a user input 1211 (e.g., a tap and long press) for an icon or a user input 1215 (e.g., a tap and long press) for a widget.

The foldable electronic device 205 may output the synchronized vibration, sound, and visual element in real time in response to the user inputs 1211 and 1215 in order to implement an effect as if an icon or widget is actually (physically) detached from the home screen 1210. Accordingly, it is possible to deliver a clear and realistic emotional experience to the user.

In FIG. 12B, the foldable electronic device 205 may display a home screen 1220 including a split view.

The foldable electronic device 205 may detect user inputs 1221 and 1225 (e.g., drag) for the split view.

The foldable electronic device 205 may output the synchronized vibration, sound, and visual element in real time in response to the user inputs 1221 and 1225 in order to implement an effect as if the split view is actually moving on the home screen 1220.

Figure 13A:
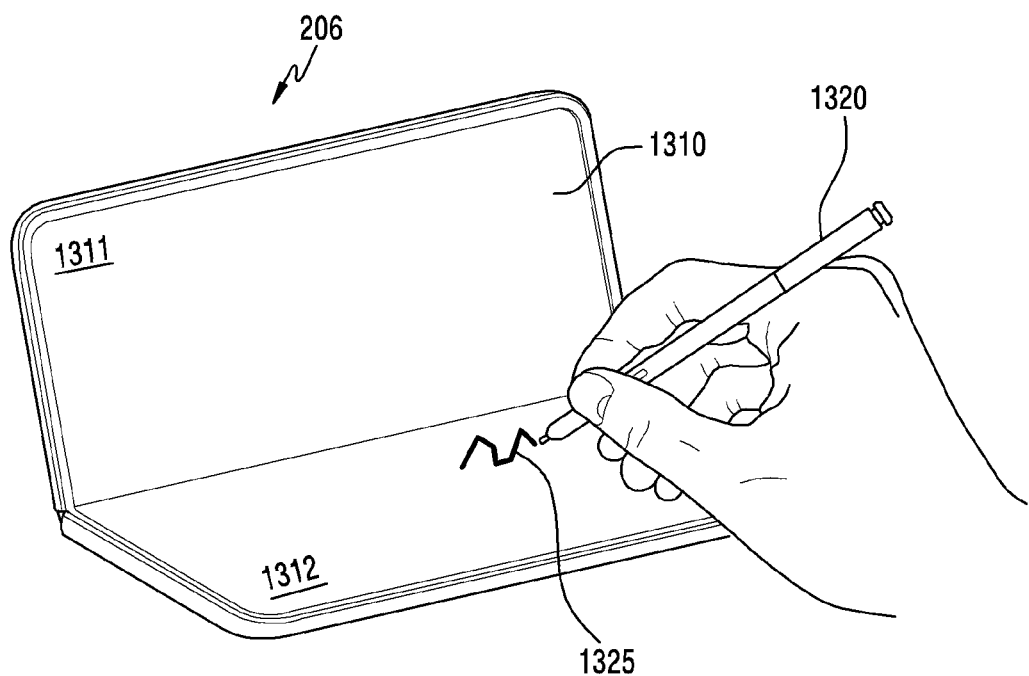
FIGS. 13A, 13B and 13C are diagrams illustrating an example method of providing a user interface of electronic devices according to various embodiments.
Figure 13B:
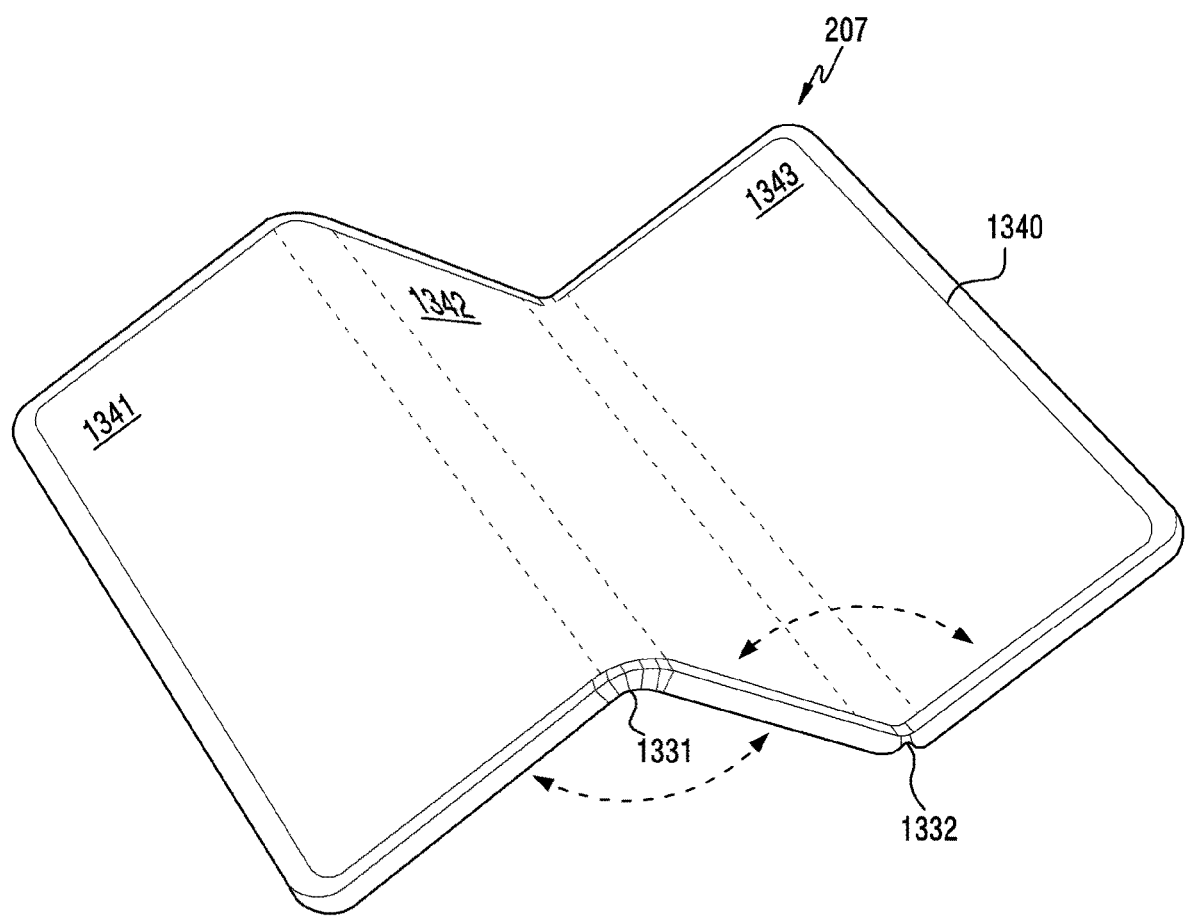
Figure 13C:
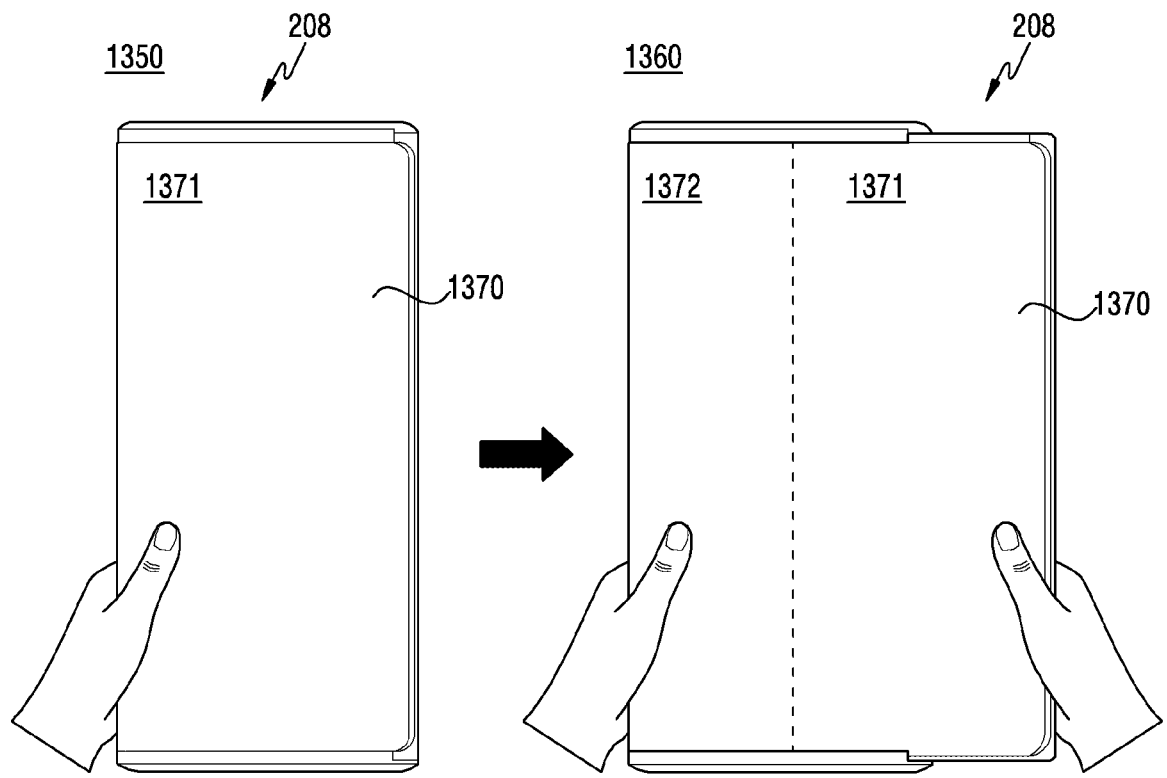

FIGS. 13A, 13B and 13C are diagrams illustrating an example method of providing a user interface of electronic devices according to various embodiments. FIGS. 13A, 13B and 13C may correspond to a method of providing a user interface of a flexible smart phone type electronic device (e.g., a foldable electronic device 206 or 207, or a slidable electronic device 208) having a variable form factor. Events illustrated in FIGS. 13A, 13B and 13C may be user input events. For example, the event may be an event for changing a mechanical state (or use state) of the foldable electronic device 206 or 207 or the slidable electronic device 208.

The electronic device 200 according to an embodiment may be the foldable electronic device 206 or 207 or the slidable electronic device 208.

In FIG. 13A, as to the foldable electronic device 206, the mechanical state may be changed according to a user's folding operation. For example, the foldable electronic device 206 may have any one of a folded state, a partial unfolded state, and an unfolded state as the folding angle is changed.

The foldable electronic device 206 may include a flexible display 1310. The flexible display 1310 may include a first area 1311 and a second area 1312.

The foldable electronic device 206 may be in a situation in which it is necessary to provide different types of user interfaces in response to the interaction of a stylus pen 1320.

When the user performs a handwriting operation using the stylus pen 1320 in the partial unfolded state of the foldable electronic device 206 as illustrated in FIG. 13A, a user input event (e.g., a writing event) may be detected.

The foldable electronic device 206 may display a visual element 1325 corresponding to the user input event (e.g., a writing event) through the flexible display 1310. The foldable electronic device 206 may output the synchronized vibration, sound, and visual elements 1325 in real time in response to the user input event.

For example, the foldable electronic device 206 may open a sound output path in advance for the purpose of fast output of sound before the writing event occurs. The foldable electronic device 206 may open the sound output path in advance in response to a pre-event of the writing event (or in response to a first timing at which the pre-event occurs).

For example, the stylus pen 1320 may include a push-pull button for turn-on and turn-off. For example, when the push-pull button is pressed to enter a push state, the stylus pen 1320 may be turned on. When the push-pull button is pressed once again to enter the pull state, the stylus pen 1320 may be turned off.

For example, the pre-event may be an event of turning on the stylus pen 1320. When the user switches the stylus pen 1320 from the turn-off state to the turn-on state, it may be an intention to use a writing function. Therefore, the foldable electronic device 206 may open the sound output path in advance in response to the turn-on event of the stylus pen 1320 (or in response to a first timing at which the turn-on event occurs) to switch a hardware element (e.g., the speaker 251 of FIG. 3) for sound output an activated state. Accordingly, the time required for sound output may be shortened, thereby enabling fast sound output. Thereafter, the foldable electronic device 206 may synchronize and output the vibration, sound, and visual element according to the user's writing input in response to the writing event (or in response to a second timing at which the writing event occurs). As the sound output path is opened in advance before the writing event actually occurs, a change according to the user's handwriting input (e.g., a gesture) may be reflected in the output vibration, sound, and visual element in real time, thereby enabling realistic expression.

FIG. 13B may correspond to an example method of providing a user interface of the foldable electronic device 207 capable of multi-folding (or Z-folding). The foldable electronic device 207 may include a flexible display 1340. The flexible display 1340 may include a first area 1341, a second area 1342, and a third area 1343.

In FIG. 13B, the foldable electronic device 207 may change its mechanical state according to a user's folding operation. For example, the foldable electronic device 207 may have any one of a full folded state, a partial folded state, and a full unfolded state as the folding angle is varied.

In the folded state according to an out-folding operation, the first area 1341 and the second area 1342 of the flexible display 1340 may be folded to face opposite directions. In the folded state according to an in-folding operation, the second area 1342 and the third area 1343 of the flexible display 1340 may be folded to face each other.

The mechanical state of the foldable electronic device 207 may be changed to correspond to the folding state of a first folding unit 1331 and a second folding unit 1332. For example, the mechanical state of the foldable electronic device 207 may be the folded state with respect to the first folding unit 1331 and the second folding unit 1332 as the center, that is, a fully folded state having a narrowest width. For another example, the mechanical state of the foldable electronic device 207 may be the partial folded state according to the intermediate folding state of the first folding unit 1331 and the second folding unit 1332 as illustrated in FIG. 13B. For another example, the mechanical state of the foldable electronic device 207 may be the unfolded state in which the first folding unit 1331 and the second folding unit 1332 are unfolded, that is, the full unfolded state having the widest width.

The foldable electronic device 207 may provide different types of user interfaces in response to a user action to change the mechanical state of the foldable electronic device 207.

The foldable electronic device 207 may detect a first event that changes the mechanical state (e.g., a hinge event for folding and/or unfolding), and may output synchronized vibration, sound, and visual element in real time in response to the first event.

For example, the foldable electronic device 207 may open the sound output path in response to the first event (e.g., a hinge event) and may adjust the vibration output timing and/or the output timing of a visual element to correspond to the sound output timing. Accordingly, the output of the vibration, the sound, and/or the visual element may be synchronized.

For another example, the foldable electronic device 207 may open the sound output path in response to a second event that is a pre-event of the first event (e.g., a hinge event), and may output the synchronized vibration, sound, and/or visual element in response to a second command For example, the pre-event (e.g., the second event) of the first event may be a grip event in which the user grips both sides of the foldable electronic device 207. For example, the action of the user gripping both sides of the foldable electronic device 207 may be an intention to fold and/or unfold the foldable electronic device 207. Therefore, the foldable electronic device 207 may open the sound output path in advance in response to the grip event (or in response to a first timing at which the grip event occurs) to switch a hardware element (e.g., the speaker 251) for sound output to an active state. Accordingly, the time required for sound output may be shortened, thereby enabling fast sound output. Thereafter, the foldable electronic device 207 may synchronize and output the vibration, the sound and/or the visual element according to the folding and/or unfolding action of the user in response to the hinge event (or in response to the second timing at which the hinge event occurs). As the sound output path is opened in advance before the hinge event actually occurs, a change according to the user's folding and/or unfolding action for the hinge event may be reflected in real time to the output vibration, sound, and/or visual element, so that a realistic expression may be possible.

FIG. 13C may correspond to an example method of providing a user interface of the slidable electronic device 208.

In FIG. 13C, the slidable electronic device 208 may change its mechanical state according to a user's sliding action. Reference numeral 1350 denotes a basic state (or a reduced state or a slide-in state) of the slidable electronic device 208. Reference numeral 1360 denotes an extended state (or a slide-out state) of the slidable electronic device 208.

The slidable electronic device 208 may include a flexible display 1370. The flexible display 1370 may include a first area 1371 and a second area 1372. The first area 1371 may always be exposed to the outside of the electronic device 208. The second area 1372 may be an area that extends from the first area 1371, is at least partially retractable into the slidable electronic device 208 by a sliding-in operation and is at least partially withdrawable to the outside of the slidable electronic device 205 by a sliding-out operation.

The slidable electronic device 208 may integrally output the synchronized vibration, sound, and visual element to implement a harmonious interaction according to the user's sliding action in real time.

An electronic device (e.g., the electronic device 200 of FIG. 2) according to various example embodiments may include: a memory (e.g., the memory 220 of FIG. 2), a display (e.g., the display 230 of FIG. 2), a haptic module comprising haptic circuitry (e.g., the haptic module 240 of FIG. 2), a sound module comprising audio circuitry (e.g., the sound module 250 of FIG. 2), and at least one processor (e.g., the processor 210 of FIG. 2). The at least one processor may be operatively connected to the memory, the display, the haptic module, and the sound module. The memory may store instructions which, when executed, cause the at least one processor to: detect an event for an output of vibration and sound, to delay the output of the vibration, to change a sound output mode from a first mode to a second mode for fast output while the output of the vibration is delayed, to output the sound using the sound module in the second mode, and to output the delayed vibration through the haptic module to be synchronized with the output of the sound.

According to various example embodiments, as the sound output mode is changed to the second mode, a sound output path may be opened to activate the sound module. According to various example embodiments, as the sound output mode is changed to the second mode, the sound output path may be changed from the first path for non-fast output to the second path for fast output.

According to various example embodiments, the memory may store instructions which, when executed, cause the at least one processor to synchronize the outputs of the sound, the delayed vibration, and a visual element by shifting an output timing of the visual element while outputting the visual element through the display.

According to various example embodiments, the sound output mode may be changed to the second mode in response to the event.

According to various example embodiments, as the sound output mode is changed to the second mode, the sound output path may be changed from the first path for non-fast output to the second path for fast output.

According to various example embodiments, the sound output mode may be changed to the second mode in response to a pre-event of the event.

According to various example embodiments, as the sound output mode is changed to the second mode in response to the pre-event, the sound output path may be opened to activate the sound module. The sound may be output through the activated sound module in response to the event.

According to various example embodiments, a sound output progress state may be sequentially switched from a standby state to a ready state, an idle state, and a playing state. As the sound output progress state is switched to the idle state, a signal requesting the output of the delayed vibration may be transmitted from the sound output path to a vibration output path.

According to various example embodiments, a first buffer may be used based on the sound output mode being the first mode, and a second buffer may be used for fast output based on the sound output mode being the second mode. The second buffer may have a smaller size or latency than the first buffer.

A method of providing a user interface of an electronic device according to various example embodiments of the disclosure may include: detecting an event for an output of vibration and sound, delaying the output of the vibration, changing a sound output mode from a first mode to a second mode for fast output while the output of the vibration is delayed, outputting the sound using the sound module in the second mode, and outputting the delayed vibration to be synchronized with the output of the sound.

According to various example embodiments, as the sound output mode is changed to the second mode, a sound output path may be opened to activate the sound module.

According to various example embodiments, as the sound output mode is changed to the second mode, the sound output path may be changed from the first path for non-fast output to the second path for fast output.

According to various example embodiments, the method may further include outputting a visual element. The method may include synchronizing the outputs of the sound, the delayed vibration, and the visual element by shifting an output timing of the visual element.

According to various example embodiments, the sound output mode may be changed to the second mode in response to the event.

According to various example embodiments, as the sound output mode is changed to the second mode, the sound output path may be changed from the first path for non-fast output to the second path for fast output.

According to various example embodiments, the sound output mode may be changed to the second mode in response to a pre-event of the event.

According to various example embodiments, as the sound output mode is changed to the second mode in response to the pre-event, the sound output path may be opened to activate the sound module. The sound may be output through the activated sound module in response to the event.

According to various example embodiments, a sound output progress state may be sequentially switched from a standby state to a ready state, an idle state, and a playing state. As the sound output progress state is switched to the idle state, a signal requesting the output of the delayed vibration may be transmitted from the sound output path to a vibration output path.

According to various example embodiments, a first buffer may be used based on the sound output mode being the first mode, and a second buffer may be used for fast output based on the sound output mode being the second mode. The second buffer may have a smaller size or latency than the first buffer.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    memory;
    a display;
    a haptic module comprising haptic circuitry;
    a sound module comprising audio circuitry; and
    at least one processor comprising processing circuitry,
    wherein the memory stores instructions which, when executed by the at least one processor individually or collectively, cause the electronic device to:
        detect an event for an output of vibration and sound, delay the output of the vibration,
change a sound output mode from a first mode to a second mode for faster output while the output of the vibration is delayed, and
output the sound using the sound module in the second mode, and output the delayed vibration through the haptic module to be synchronized with the output of the sound.

2. The electronic device of claim 1, wherein as the sound output mode is changed to the second mode, a sound output path is opened to activate the sound module.

3. The electronic device of claim 1, wherein as the sound output mode is changed to the second mode, a sound output path is changed from a first path for non-fast output to a second path for faster output.

4. The electronic device of claim 1, wherein the memory stores instructions which, when executed, cause the at least one processor to:
synchronize the outputs of the sound, the delayed vibration, and a visual element by shifting an output timing of the visual element while outputting the visual element through the display.

5. The electronic device of claim 1, wherein the sound output mode is changed to the second mode in response to the event.

6. The electronic device of claim 5, wherein as the sound output mode is changed to the second mode, a sound output path is changed from a first path for non-fast output to a second path for faster output.

7. The electronic device of claim 1, wherein the sound output mode is changed to the second mode in response to a pre-event of the event.

8. The electronic device of claim 7, wherein
as the sound output mode is changed to the second mode in response to the pre-event, a sound output path is opened to activate the sound module, and
the sound is output through the activated sound module in response to the event.

9. The electronic device of claim 1, wherein
a sound output progress state is sequentially switched from a standby state to a ready state, an idle state, and a playing state, and
as the sound output progress state is switched to the idle state, a signal requesting the output of the delayed vibration is transmitted from a sound output path to a vibration output path.

10. The electronic device of claim 1, wherein a first buffer is used based on the sound output mode being the first mode and a second buffer is used for faster output based on the sound output mode being the second mode, and the second buffer has a smaller size or latency than the first buffer.

11. A method of providing a user interface of an electronic device, the method comprising:
detecting an event for an output of vibration and sound;
delaying the output of the vibration;
changing a sound output mode from a first mode to a second mode for faster-output while the output of the vibration is delayed; and
outputting the sound using the sound module in the second mode, and outputting the delayed vibration to be synchronized with the output of the sound.

12. The method of claim 11, wherein as the sound output mode is changed to the second mode, opening a sound output path to activate the sound module.

13. The method of claim 11, wherein as the sound output mode is changed to the second mode, a sound output path from a first path for non-fast output is changed to a second path for faster output.

14. The method of claim 11, further comprising:
outputting a visual element,
wherein the outputting of the sound, the delayed vibration, and synchronizing the visual element by shifting an output timing of the visual element.

15. The method of claim 11, wherein the sound output mode is changed to the second mode in response to the event.

16. The method of claim 15, wherein as the sound output mode is changed to the second mode, a sound output path is changed from a first path for non-fast output to a second path for faster output.

17. The method of claim 11, wherein changing the sound output mode to the second mode is done in response to a pre-event of the event.

18. The method of claim 17, wherein
as the sound output mode is changed to the second mode in response to the pre-event, opening a sound output path to activate the sound module, and
outputting the sound through the activated sound module in response to the event.

19. The method of claim 11, wherein
sequentially switching a sound output progress state from a standby state to a ready state, an idle state, and a playing state, and
as the sound output progress state is switched to the idle state, transmitting a signal requesting the output of the delayed vibration from a sound output path to a vibration output path.

20. The method of claim 11, wherein a first buffer is used based on the sound output mode being the first mode and a second buffer is used for faster output based on the sound output mode being the second mode, and the second buffer has a smaller size or latency than the first buffer.

* * * * *